(12) United States Patent
Breedvelt-Schouten et al.

(10) Patent No.: US 10,936,156 B2
(45) Date of Patent: Mar. 2, 2021

(54) INTERACTIVE ACCESS TO ASCENDANTS WHILE NAVIGATING HIERARCHICAL DIMENSIONS

(71) Applicant: INTERNATIONAL BUSINESS MACHINES CORPORATION, Armonk, NY (US)

(72) Inventors: Ilse I Breedvelt-Schouten, Manotick (CA); Maria Gabriela Sanches, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/180,766

(22) Filed: Nov. 5, 2018

(65) Prior Publication Data
US 2020/0142546 A1 May 7, 2020

(51) Int. Cl.
*G06F 3/048* (2013.01)
*G06F 3/0482* (2013.01)
*G06F 3/0485* (2013.01)
*G06F 16/26* (2019.01)
*G06F 16/22* (2019.01)

(52) U.S. Cl.
CPC .......... *G06F 3/0482* (2013.01); *G06F 3/0485* (2013.01); *G06F 16/2246* (2019.01); *G06F 16/26* (2019.01)

(58) Field of Classification Search
CPC .... G06F 16/2246; G06F 16/26; G06F 3/0485; G06F 3/0483
See application file for complete search history.

(56) References Cited

U.S. PATENT DOCUMENTS

| | | | |
|---|---|---|---|
| 7,475,365 | B2 | 1/2009 | Nan |
| 7,984,388 | B2 | 7/2011 | Dieberger |
| 8,429,521 | B2 | 4/2013 | Lloyd |
| 9,542,478 | B2 | 1/2017 | Eide |
| 2005/0060647 | A1 | 3/2005 | Doan |

(Continued)

OTHER PUBLICATIONS

Yin-Bo Wan et al., Mining Multilevel Association Rules With Dynamic Concept Hierarchy, Jul. 1, 2008, IEEE, pp. 287-292 (Year: 2008).*

(Continued)

*Primary Examiner* — Tam T Tran
(74) *Attorney, Agent, or Firm* — Steven M. Bouknight

(57) ABSTRACT

A method for controlling data from a data hierarchy with enhanced interactive access to ascendants while navigating in hierarchical dimensions of a materialized view renders a segmented band along each axis of a grid layout using a different background style for each level identified in the hierarchy. Heading titles for parents at a same visual hierarchy use a same background style and fill a space between a heading and respective child levels. When user traversal axially causes a heading title of a parent node to become invisible from a node headings bar in the segmented band of a respective axis, the heading title is promoted to a matching segment. An interactive control is rendered adjacent to the promoted heading enabling direct navigation to that parent node. Invoking the interactive control renders the visual hierarchy with the heading title of the parent node shown first in the node headings bar.

19 Claims, 19 Drawing Sheets

(56) References Cited

U.S. PATENT DOCUMENTS

| | | | |
|---|---|---|---|
| 2005/0160411 A1* | 7/2005 | Sangal | G06F 8/20 717/144 |
| 2006/0004873 A1* | 1/2006 | Wong | G06F 16/26 |
| 2007/0162936 A1* | 7/2007 | Stallings | G06F 3/0482 725/58 |
| 2013/0198663 A1 | 8/2013 | Matas et al. | |
| 2015/0067556 A1 | 3/2015 | Tibrewal et al. | |
| 2015/0378563 A1 | 12/2015 | Ramanathan et al. | |
| 2016/0117308 A1* | 4/2016 | Haider | G06F 3/00 715/217 |

OTHER PUBLICATIONS

Felipe Bacim et al., Wayfinding Techniques for MultiScale Virtual Enrironments, Mar. 1, 2009, IEEE Symposium on 3D User Interfaces, pp. 67-74 (Year: 2009).*

George Nagy et al., Table Headers: An Entrance to The Data Mine, Dec. 1, 2016, IEEE, pp. 4065-4070 (Year: 2016).*

Mostafa Alli et al., Automatic Page Scrolling for Mobile Web Search, Nov. 1, 2014, IEEE Xplore, pp. 175-182 (Year: 2014).*

Mehta et al., "A Hierarchy Navigation Framework: Supporting Scalable Interactive Exploration Over Large Databases", Ninth International Database Engineering and Applications Symposium (IDEAS 2005), pp. 425-434 Jul. 2005, <http://davis.wpi.edu/xmdv/documents.html>.

* cited by examiner

FIG. 4

| | | All Market | Big Marke... | Small Mar... | |
|---|---|---|---|---|---|
| All Years | | 25376882.27 | 22909387.99 | 2467494.28 | |
| 2015 | | 22850404.39 | 20818097.45 | 2032306.94 | |
| 2015 - Jan | | 1818893.05 | 1641060.90 | 177832.15 | |
| 2015 - Feb | | 1818172.23 | 1650317.44 | 167854.80 | |
| 2015 - Mar | | 1819198.62 | 1651218.16 | 167980.47 | |
| 2015 - Apr | | 1797477.89 | 1631259.78 | 166218.11 | |
| 2015 - May | | 1797477.89 | 1631259.78 | 166218.11 | |
| 2015 - Jun | | 1797477.89 | 1631259.78 | 166218.11 | |
| 2015 - Jul | | 2202969.00 | 2029074.91 | 173894.09 | |
| 2015 - Aug | | 2202969.00 | 2029074.91 | 173894.09 | |
| 2015 - Sep | | 2202969.00 | 2029074.91 | 173894.09 | |
| 2015 - Oct | | 1797666.61 | 1631498.96 | 166167.64 | |
| 2015 - Nov | | 1797666.61 | 1631498.96 | 166167.64 | |
| 2015 - Dec | | 1797666.61 | 1631498.96 | 166167.64 | |
| 2014 | | 1241395.88 | 1020586.54 | 220809.34 | |
| 2014 - Jan | | 103449.66 | 85048.88 | 18400.78 | |

Collapse control 404, Date 406, Expand control 402, Markets 408, Table 400

Table 500

FIG. 19
FIG. 20
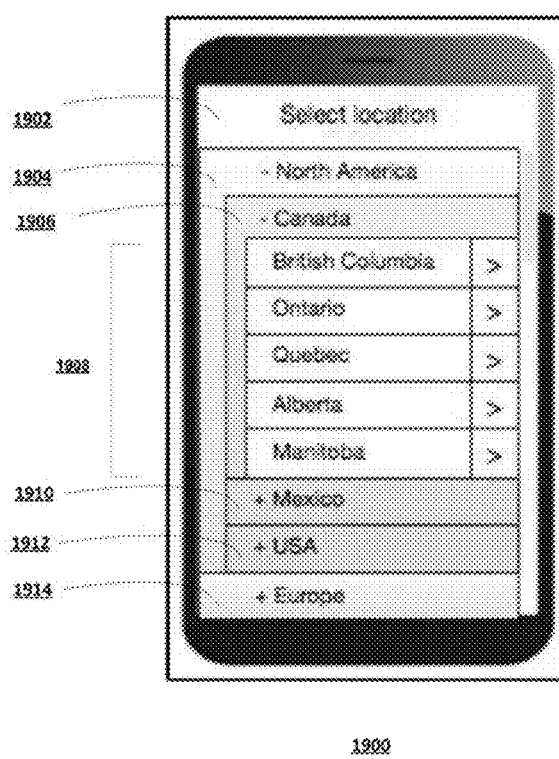
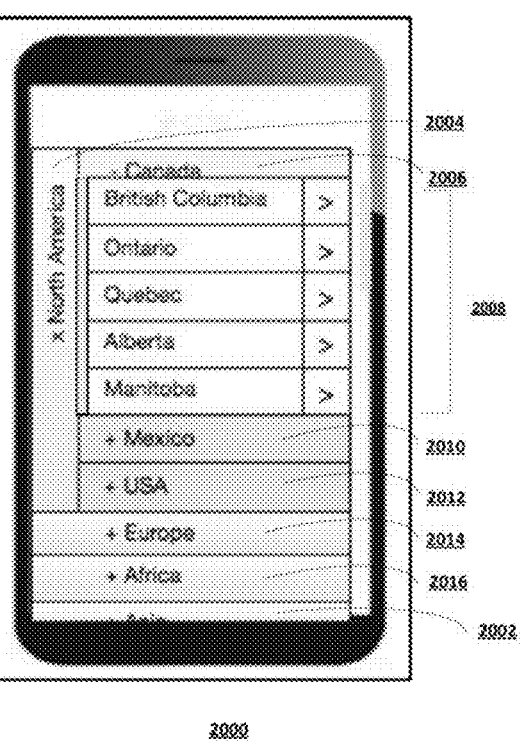

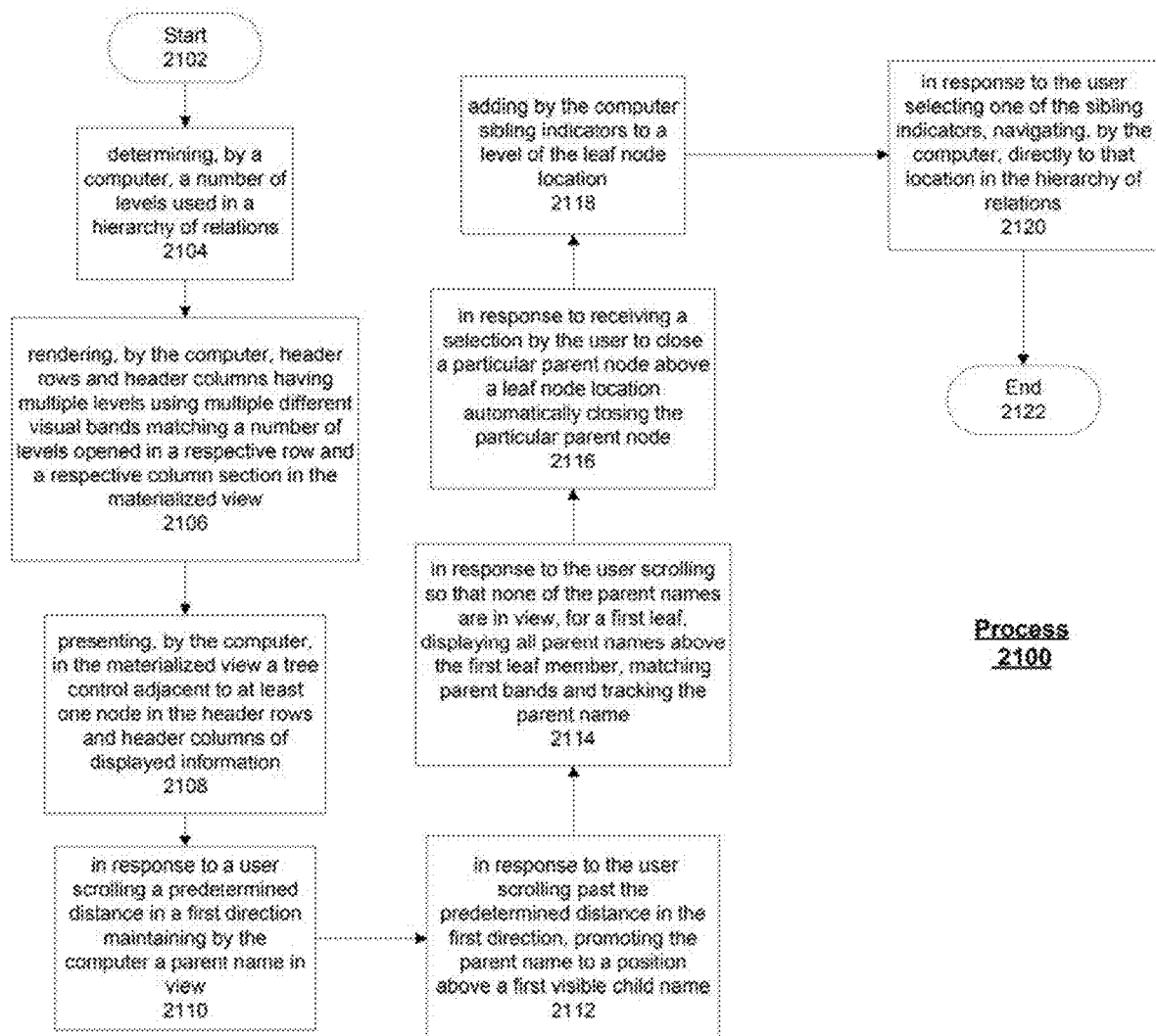

INTERACTIVE ACCESS TO ASCENDANTS WHILE NAVIGATING HIERARCHICAL DIMENSIONS

BACKGROUND

The present invention generally relates to hierarchical data structures within a data processing system. More specifically, the present invention relates to an interactive display using the hierarchical data structures.

Information in the data processing systems is typically stored in a variety of formats including files, documents, and objects. A common practice organizes and locates the elements of information using a file structure that is hierarchical. Information may be organized in a "tree" type of hierarchical file structure. In this tree structured file system, the various files are organized with a single node referred to as a "root." Other nodes connected directly to this root form a parent (root) and child (other nodes) relationship. One or more additional nodes may be subsequently connected to any other node in this tree structure using the parent-child relationship. For example, in the computer-implemented file system, each node having a connected child node may be referred to as a directory of files. A particular node that has no additional child node connected is referred to as a "leaf" node. This leaf node is connected to the tree structure only by a parent node immediately above. These leaf nodes can also be empty subdirectories or files. A particular portion or branch of the tree structure defined from one designated node, including children under this designated node, defines a "sub-tree."

A view of the tree representation of a hierarchical file structure is adequate when a quantity of information is reasonable. As the quantity of information increases, a tree view typically does not scale well because of the depth and breadth of the hierarchical file structure. In this case, the depth of the tree structure defined by a number of parent-child node relationships, and the breadth of the tree structure defined by a number of sibling relationships, increase overall complexity of the hierarchical file structure and lead to a corresponding reduction in efficiency. Complex tree structures, however, are typical in data processing systems.

A user is typically able to view only a small portion of a large tree structure at a time. As a result, the user is able to focus only on a subsection of the large tree structure, while losing context involving other parts of the large tree structure. Therefore, the user does not know whether the other parts of the large tree structure are relevant to the current context in view. Furthermore, the user may have lost relative positioning within the large tree structure due to viewing only the small portion of the large tree structure.

Typical expansion and contraction of a portion of the large tree structure are achieved using discrete operations. Expansion of a large sub-tree portion typically creates a view that shows some direct children of that sub-tree portion but cannot show all direct children. The created view typically omits many of the entries in the large sub-tree portion as well as higher-level entries that were not children of the sub-tree portion of interest. Furthermore, when large sub-tree portion was collapsed, the large sub-tree is hidden from view of the user and may therefore lead to confusion of the user regarding positioning within the large tree structure. For example, a user chooses to view a task list for a project comprising many members and opens, or expands, the task list to display all members. However, only a limited number of members can fit within a view. When the user chooses to collapse this task list, all members are hidden from view.

Users, through user interfaces, access computers to view portions of the large tree structure. User interfaces typically comprise a visual display that renders the data of the large tree structure and enables the users to manipulate the displayed content using controls including a mouse and keyboard or simple gestures. In the example above using the task list, not all relevant data can be displayed to a user at one time on the visual display. Paging mechanisms are used to reduce a number of items to be displayed at a given time, enabling a representation of a large amount of data of the task list without displaying all of the data. Existing paging mechanisms and user interfaces however do not enable partitioning of the data into multiple levels and are external to the data. For example, a scroll bar enables a user to scroll down a list and view differing members of the list as the user moves the scroll bar. However, these existing paging mechanisms do not provide quick access to all parts of a large list and typically enable viewing only a predetermined number of members. Therefore, there is a need for a system, a computer program product, and associated method to overcome these limitations.

SUMMARY

According to an embodiment of the present invention, a computer-implemented method for controlling data from a data hierarchy with enhanced interactive access to ascendants while navigating in hierarchical dimensions of a materialized view begins by identifying, by a computer, a number of levels within the data hierarchy to be displayed along each axis of a grid layout. Rendering is performed for each axis by the computer, using a different background style for each hierarchy level, to display in a segmented band along a respective axis heading titles for parents at a same visual hierarchy using a same background style and filling a space between a heading and respective child levels. The computer receives an indication that a user has traversed axially causing a heading title of a parent node to be out of sight from a node headings bar in the segmented band of a respective axis. The computer renders the heading title of the parent node by promoting the heading title of the parent node to a matching segment of the segmented band of the respective axis that stretches above the node headings bar. Additionally, the computer renders an interactive control adjacent to the heading title of the parent node promoted to enable the user to navigate to a starting-point of that parent node directly. In response to the user invoking the interactive control in front of the parent node displayed in the segment of the segmented band, rendering, by the computer, the visual hierarchy such that the heading title of the parent node is shown as a first item in the node headings bar.

According to another embodiment of the present invention, a computer-implemented method for enhanced interactive access to ascendants while navigating in hierarchical dimensions in a materialized view begins by determining, by a computer, a number of levels used in a hierarchy of relations. The computer renders header rows and header columns having multiple levels using multiple different visual bands matching a number of levels opened in a respective row and a respective column section in the materialized view. The computer further presents in the materialized view, a tree control adjacent to at least one node in the header rows and header columns of displayed information. In response to a user scrolling a predetermined distance in a first direction, the computer maintains a parent name in view. In response to the user scrolling past the predetermined distance in the first direction, the computer promotes the parent name to a position above a first visible child name. In response to the user further scrolling so that none of the parent names are in view, the computer continues, for a first leaf, by displaying all parent names above the first leaf member, matching parent bands and tracking the parent name. In response to receiving a selection by the user to close a particular parent node above a leaf node location, the computer automatically closing the particular parent node. The computer continues by adding sibling indicators to a level of the leaf node. In response to the user selecting one of the sibling indicators, the computer continues navigating directly to that location in the hierarchy of relations.

In other embodiments, the present invention may be represented in a system, and/or a computer program product at any possible technical detail level of integration as exemplified in the accompanying claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 4 is a tabular view of hierarchical data in a graphical user interface in accordance with one embodiment of the disclosure;

FIG. 7 is a tabular view of a visual display of hierarchical data as a result of a user scrolling past a column heading in accordance with one embodiment of the disclosure;

FIG. 8 is a tabular view of a visual display of hierarchical data including a visual cue for a hidden column heading in accordance with one embodiment of the disclosure;

FIG. 10 is a tabular view of a visual display of hierarchical data including visual cues for more than one hidden sibling in accordance with one embodiment of the disclosure;

FIG. 11 is a tabular view of a visual display of hierarchical data including interactive controls for row headings in accordance with one embodiment of the disclosure;

FIG. 12 is a tabular view of a visual display of hierarchical data as a result of a user scrolling past a row heading in accordance with one embodiment of the disclosure;

FIG. 13 is a tabular view of a visual display of hierarchical data as a result of a user scrolling past more than one row heading in accordance with one embodiment of the disclosure;

FIG. 19 is a view of a visual display on a mobile device of hierarchical data in one embodiment of the disclosure;

FIG. 20 is a view of a visual display on a mobile device of hierarchical data of FIG. 19 when scrolling in one embodiment of the disclosure; and FIG. 21 is a flow diagram of a process for controlling data from a data hierarchy with enhanced interactive access to ascendants while navigating in hierarchical dimensions of a tabular view in accordance with another embodiment of the disclosure.

DETAILED DESCRIPTION

Figure 1:
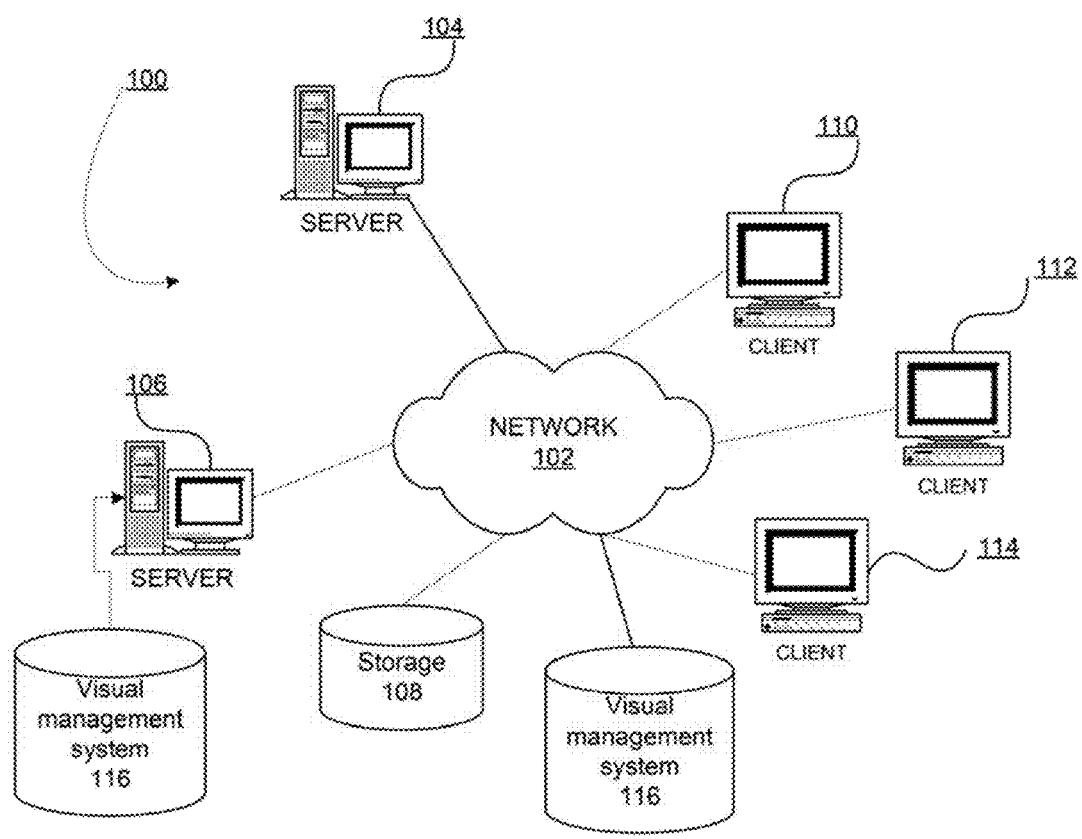
FIG. 1 is a block diagram of a network data processing system operable for various embodiments of the disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A set of definitions and explanations provide further background information pertaining to the technical field of embodiments of the present invention, and are intended to facilitate the understanding of the embodiments of the present invention without limiting its scope. A node is a point or vertex in a graph or hierarchical structure. A root node, also referred as a root, is a particular type of node having no parent but typically does have children. A leaf node, also referred as a leaf, is another particular type of node connected to the tree structure through a parent but without children. A sub-tree is a defined portion or branch of the tree structure from a designated node including all children beneath the designated node. Within the tree structure, a level comprises a number of nodes or more particularly, sub-trees, required to traverse from the root to a target destination node. As a result, nodes categorized as belonging to the same level are defined to be the same distance from the root node as determined by a number of sub-trees traversed to reach a target node. A hierarchy is a particular type of data structure used to organize objects, elements, entries or members, into categories. Typically a hierarchy comprises a set of categories, in which each category contains one or more objects that are further divided into sub-categories, which may be further sub-divided to create a multi-level data structure. A tree is a hierarchical structure comprising a number of nodes that are connected by edges from one node (parent) to another node (child). A particular single node located at a top most position of the tree is the root node. At an extreme opposite location to this root node is a leaf node.

Figure 2:
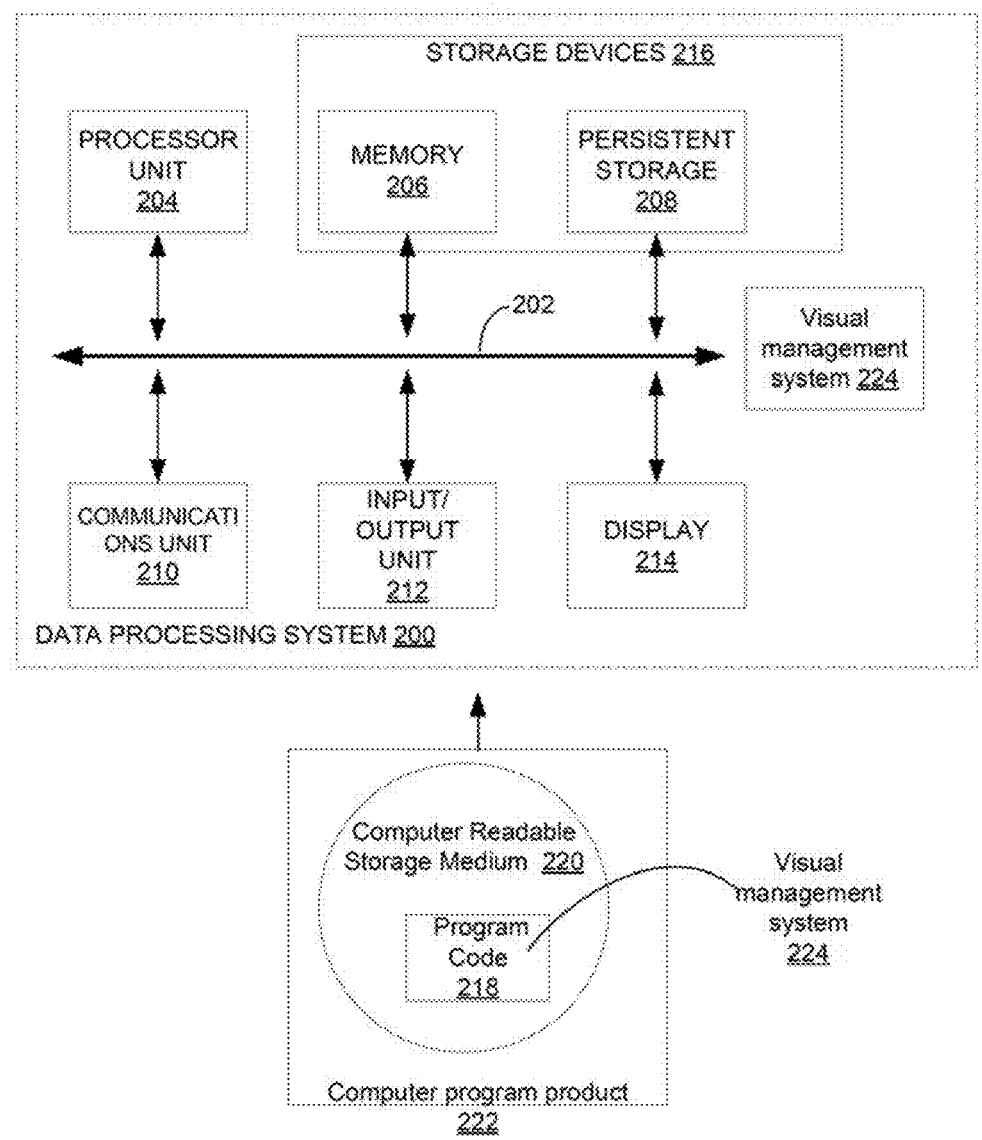
FIG. 2 is a block diagram of a data processing system in the network data processing system of FIG. 1 operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, visual management system 116 and applications to clients 110, 112, and 114. Clients 110, 112, and 114 are clients to server 104 in this example. In addition visual management system 116 may also be directly connected to network 102. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, display 214 and decorrelation system 224.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In another example, visual management system 224 may also be contained within memory 206 or persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable. In one example, program code 218 contains program code which when executed causes visual management system 224 to be fully functional.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the Operating System (OS) provides the facilities that may support the requirements of the embodiments of the present invention. Any limitations presented may be quite likely a result of a particular type of OS, data processing system programming language, or data processing system and may not be a limitation of the embodiment of the present invention.

Figure 3:
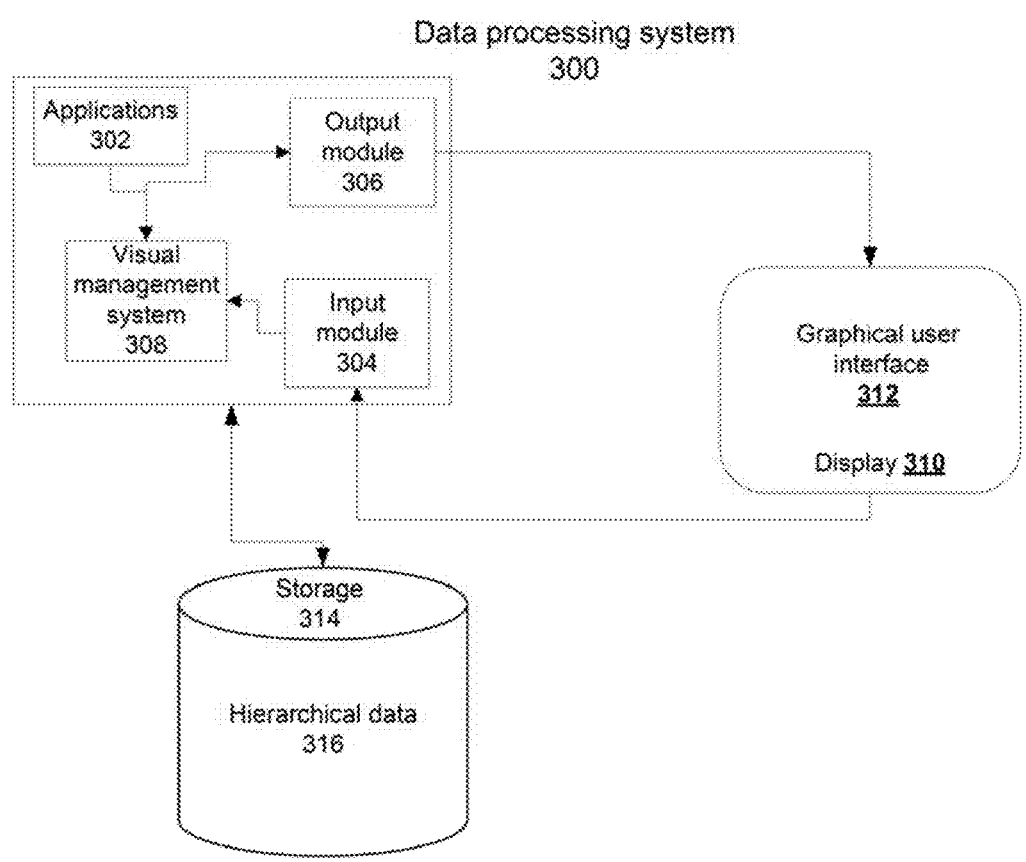
FIG. 3 is a block diagram representation of a data processing system operable for various embodiments of the disclosure.

FIG. 3 is a block diagram of components of data processing system 300 in an example of an embodiment of the disclosure. Data processing system 300 is a variation of data processing system 200 of FIG. 2. Data processing system 300 comprises a number of components similar to those in data processing system 200 of FIG. 2 and including applications 302, input module 304, output module 306, visual management system 308, display 310, graphical user interface 312, storage 314 and hierarchical data 316.

Applications 302 represent a set of application programs that execute on data processing system 300 providing benefits to those who use the system. In one example, applications 302 include data manipulation programs to analyze hierarchical data 316 and generate one or more results in the form of cross tables or pivot tables. Input module 304 receives user input as a result of user interaction activity using graphical user interface 312 with information presented on display 310. Output module 306 receives information from visual management system 308 including data elements processed and presentation information for output on graphical user interface 312 of display 310. Storage 314 provides a computer readable and writable memory to maintain hierarchical data 316 for processing using one or more processes associated with applications 302 and visual management system 308. Visual management system 308 provides a capability to view within a current context hierarchical data 316 processed by applications 302, while maintaining that current context using one or more visual cues and controls associated with the data presented using graphical user interface 312.

Visual management system 308 further comprises capabilities to model, control and view the hierarchical data. In one example embodiment of visual management system 308 a set of components comprising a model-view-controller scenario is used. This model-view-controller scenario is further described in FIG. 16.

The descriptions of the various embodiments of the present invention are presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

In the following examples, a data hierarchy is described within a tabular view first using columns comprising a parent level of All markets and a child level comprising siblings of a Big market, including countries of USA, Brazil, China, India and Small markets including countries of Chile, Denmark, Greece, Iceland and others. There are three levels in the example data hierarchy: All markets; Market size (big markets, small markets); and Countries (Chile, Denmark, Greece and others). Siblings occur within a level (Market size) and below their respective parent (All markets) and are defined as Big markets and Small markets. Nodes show as heading titles of these siblings. The siblings, within a level (Countries), below their parent (Small markets) are typically shown as Chile, Denmark, Greece, Iceland and others. A node headings bar including the column headings is visible across a column axis. In the examples, the parent level of All markets is in an outer band, flowed by a parent level for next band of Market size.

In a similar manner the data hierarchy is also described second using rows comprising three levels as in All years; Years and Months. Siblings, within a level (Year) are defined below a parent (All years) for example, include years of 2012, 2013, 2014 and 2015. Siblings, within a level (Months) and below a parent for example, year 2015, include individual month names abbreviated as in Jan, Feb and Mar through Dec. A corresponding node headings bar including row headings is visible along a vertical row axis. In the examples, the parent level of All years is in an outer band, followed by a parent level for next band of years.

The tabular view is representative of one or more computations using data in the data hierarchy to create and materialize an exemplary view comprising a cross table or pivot table of the data. Individual entries in the body of a table represent data points or intersect values resulting from the one or more computations.

Multidimensional displays of hierarchies including the cross table or pivot table of the above typically use controls in the form of + sign and – sign to visually indicate a capability to respectively expand or collapse members associated with the controls. In the example of FIG. 4 a tabular view of a data hierarchy is presented in table 400, in which viewing controls are shown within row headings and column headings. Viewing controls in this example are represented by either a + sign of expand control 402 informing the user an associated object can be expanded in an alternative view or a – sign of collapse control 404 informing the user an associated object can be collapsed in an alternative view. Date 406 lists a range of dates associated with respective corresponding columns values of markets 408. In this current view, column headings of markets 408 include All Markets, Big Market and Small Market, which are visible providing a visual hierarchy of two levels. Furthermore, the column heading of All Markets has an associated collapse control 404, while headings of Big Market and Small Market each have an associated expand control 402. In a similar manner row headings of Date 406, comprising entries of All Years, 2015 and 2014 each have an associated collapse control 404. The row headings of Date 406 present a visual hierarchy of three levels including all years, year and month.

Figure 5:
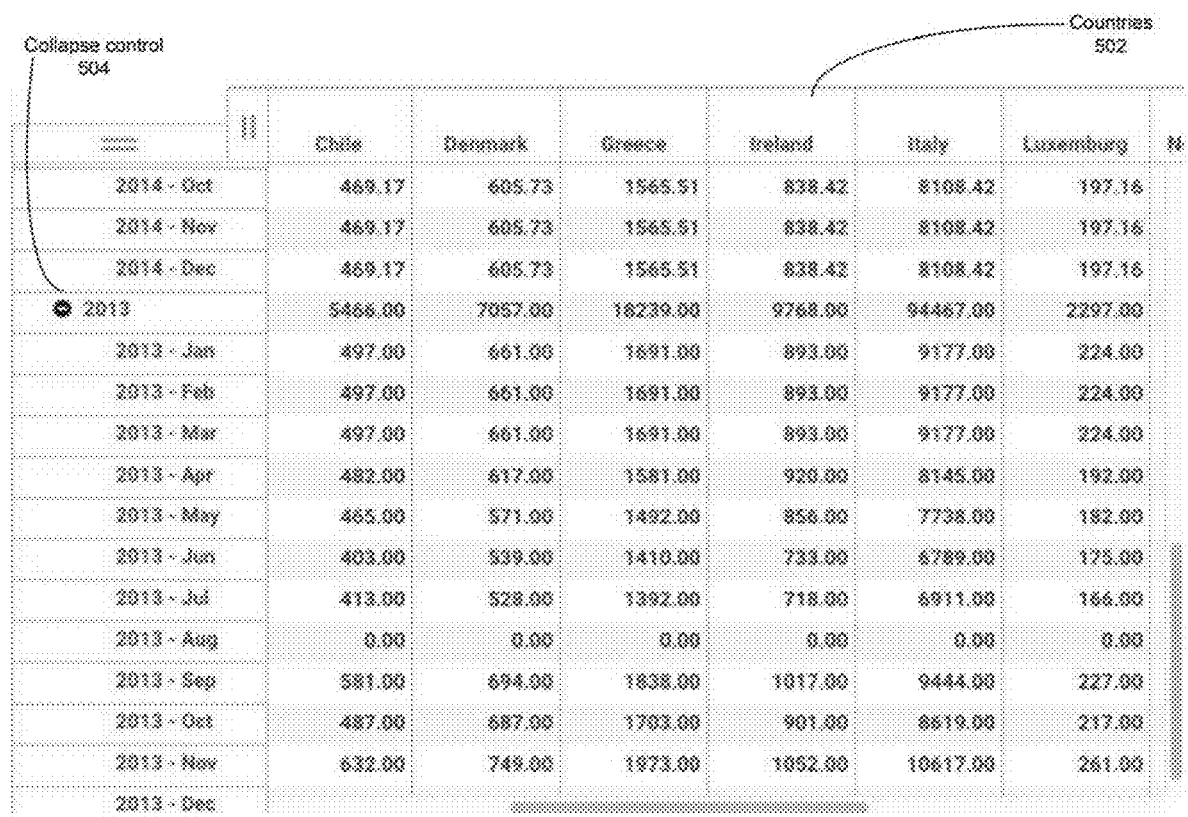
FIG. 5 is expanded tabular view of the tabular view of FIG. 4 in accordance with one embodiment of the disclosure.

However, with reference to FIG. 5 once the user starts expanding entries and scrolling, tracking what data is actually being viewed typically becomes problematic for the user. In the example of FIG. 5 table 500 is a result of the user previously invoking a control to expand and change the view of FIG. 4. The data being viewed is associated with some months from year 2014 and all months from year 2013. However, it is not clear whether countries 502 currently displayed belong to one of All Markets, Big Market and Small Market. Furthermore, there is an absence of controls for countries 502. Therefore, the user cannot further manipulate these entries to either expand or collapse one or more entries.

Using the tree-like structure defined in the rows and columns as shown in FIG. 4 and FIG. 5, the user typically has difficulty maintaining an awareness of relative positioning within the data hierarchy once scrolling left or right in the column headings or up and down in the row headings occurs. As the hierarchy becomes even deeper, identifying where a particular data entry may be located within this hierarchy becomes more challenging. A solution is needed to enable user awareness of what data is viewed while scrolling, expanding and collapsing within a data hierarchy as represented by a pivoted tree-structured data set. In a further example, being able to directly close a parent such as year 2014, once the user has scrolled further, becomes more difficult because the user has to scroll back to locate the respective parent, which is no longer visible. Furthermore, tree controls, especially when associated with large data sets, and also especially when in columns, are very hard to comprehend by users.

Figure 6:
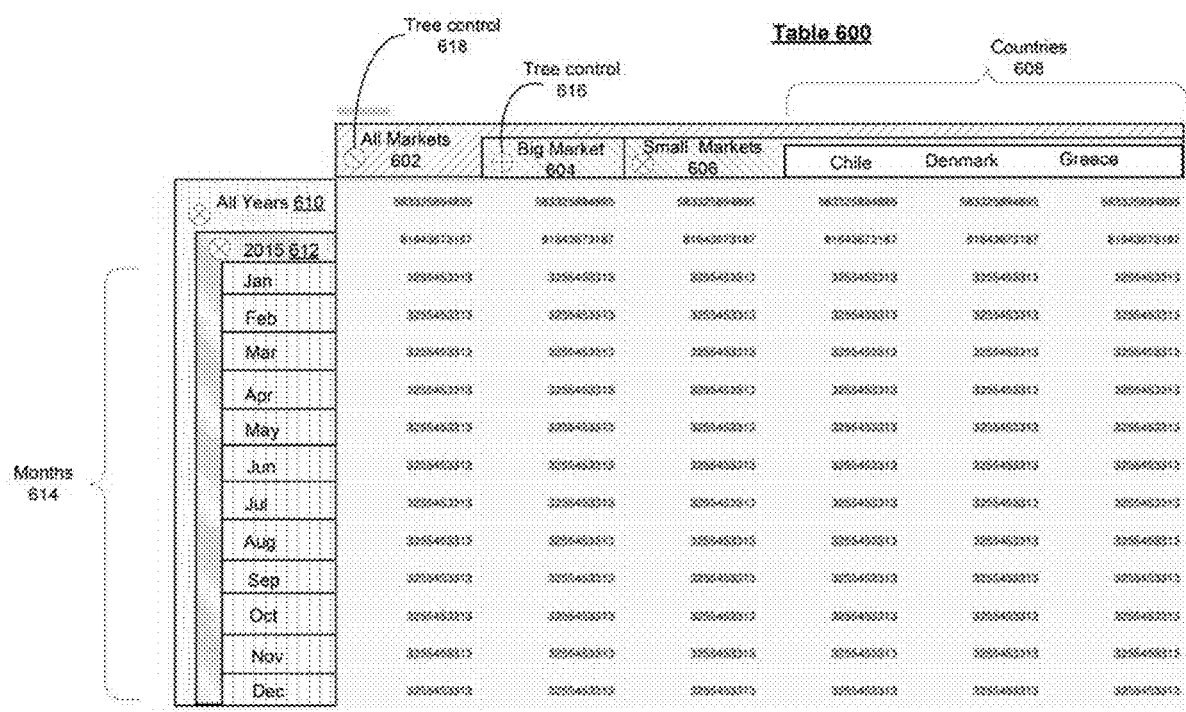
FIG. 6 is a tabular view of a visual display of hierarchical data including interactive controls in accordance with one embodiment of the disclosure.

With reference to FIG. 6, an example of visual display of hierarchical data in an embodiment of the present invention, is depicted in the form of table 600. The data processing system determines a number of levels used to render the hierarchical data in a particular view. The header cell rows and header cell columns having multiple data levels are rendered in a manner to distinguish one level from another. Various visual techniques may be used to distinguish data levels visually from one another, differing techniques matching the number of levels opened in a row or column section. Visual distinction may use techniques including color, highlighting, shading, transparency layers and cross-hatching. Column headings of table 600 are labeled as All Markets 602, Big Market 604, Small Markets 606 and Countries 608. Row headings are labeled All Years 610, 2015 612 (year 2015) and months 614 comprises abbreviated 3-letter month names Jan through Dec. Countries 608 is a set of sibling entries defined as members of Small Markets 606.

The user may freely scroll through Countries 608 to review desired content, resulting in a change of data viewed. Tree control 616 next to column heading Big Market 604 informs a user that this column can be expanded in another view. Tree control 618 next to column heading All Markets 602 informs the user that this column can be collapsed in another view. In a similar manner to the column heading, a row heading that can be expanded or collapsed also has a tree control associated with a respective entry. When no tree control is present the respective row or column heading entry cannot be manipulated to create another version of the view. In the current examples, the term tree control is used, however, the term interactive control may also be used interchangeably.

In the current example, column headings are displayed horizontally in a set of segmented bands. The visual style of each visible parent stretches above the children markets to remain visible above the children. For example, the heading of column heading All Markets 602 stretches above the children comprising Big Market 604 and Small Markets 604 further across child entries of Countries 608.

The set of segmented bands may be described as having an elastic property enabling the bands within and therefore the set of segmented bands to expand and contract in number and size as required to main the visual styles of visible parents stretching above respective child entries. The expansion and contraction in number and size is a result of user interaction with elements of the display of hierarchical data.

Using the example of FIG. 6, a scenario is further described using an embodiment of the disclosure beginning with table 600 in a condition in which no scrolling has occurred. When a user commences scrolling to the right within the view, initially the parent name is still in view. However, as the user scrolls further to the right, instead of losing the heading name of the parent column, this heading name is promoted above a first visible child name. For example, when the view has a number of levels and the user has scrolled a particular distance so that none of the parents remained in sight, the first leaf member will show all the parent names above that respective first leaf member, matching the parent bands. When the user decides to close a parent node, typically by a single click above the leaf node location, the parent node selected will automatically close. The data processing system also adds sibling indicators to a respective level. When the user clicks on the sibling indicator, the user navigates to that particular position in the data hierarchy.

Figure 7:
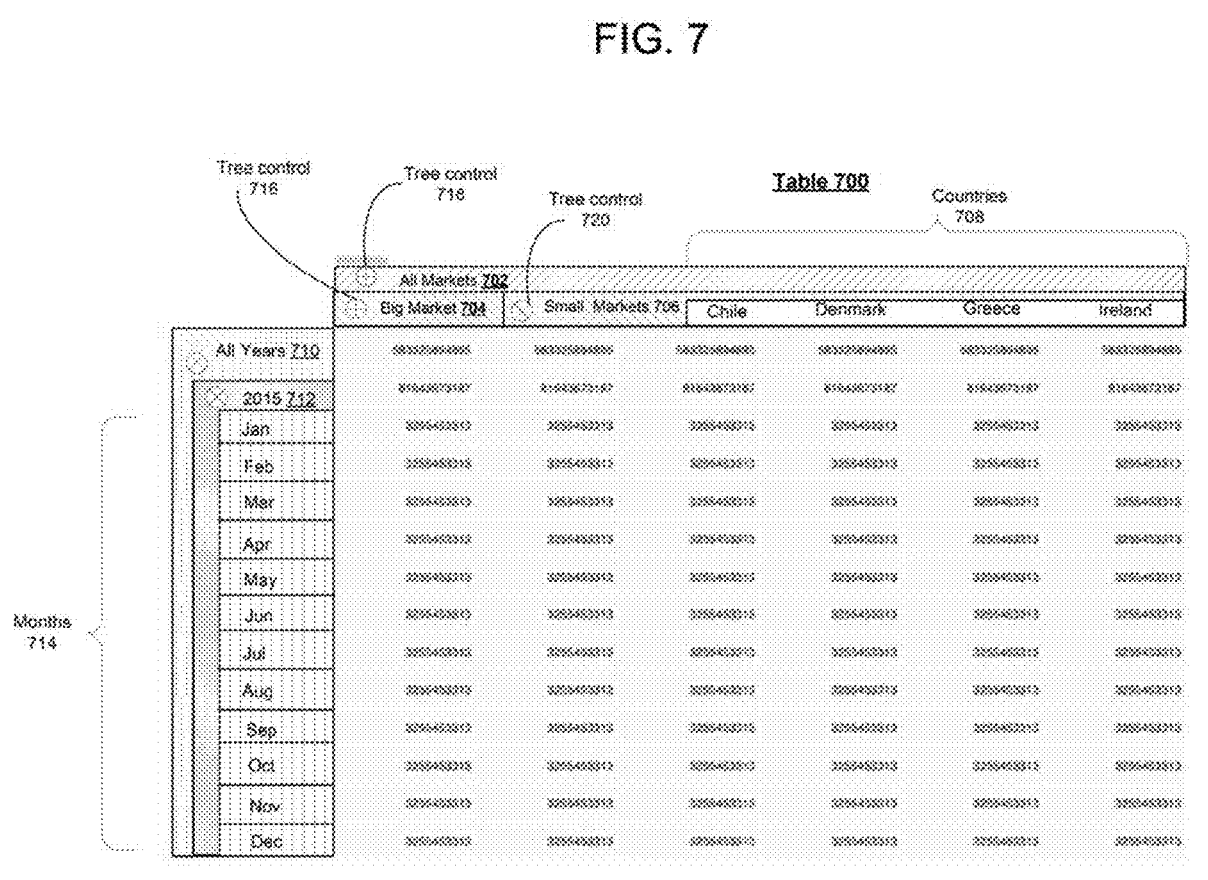

Continuing with the example of FIG. 6, FIG. 7 depicts, using an embodiment of the invention, table 700 as a result of the user scrolling past the column heading All Markets 702. The number of countries 708 is now changed from three previously to four and the column heading All Markets 702 is promoted above the headers of the children of All Markets 702. Note also tree control 718 is now a plus sign as shown to the left of All Markets 702. In an event the user wants to expand column All Markets 702 again, the user can scroll back to an initial point or simply tap on tree control 718. Alternatively, the user may simply tap on the visualized full top header area of All Markets 702 to expand column All Markets 702. Row headings are now labeled All Years 710, 2015 712 (year 2015) and months 714 comprising abbreviated 3-letter month names Jan through Dec. Tree control 716 is a plus sign as shown to the left of Big Market 704. Tree control 720 next to column heading Small Markets 706 informs the user that this column can be collapsed in alternate view.

Figure 8:
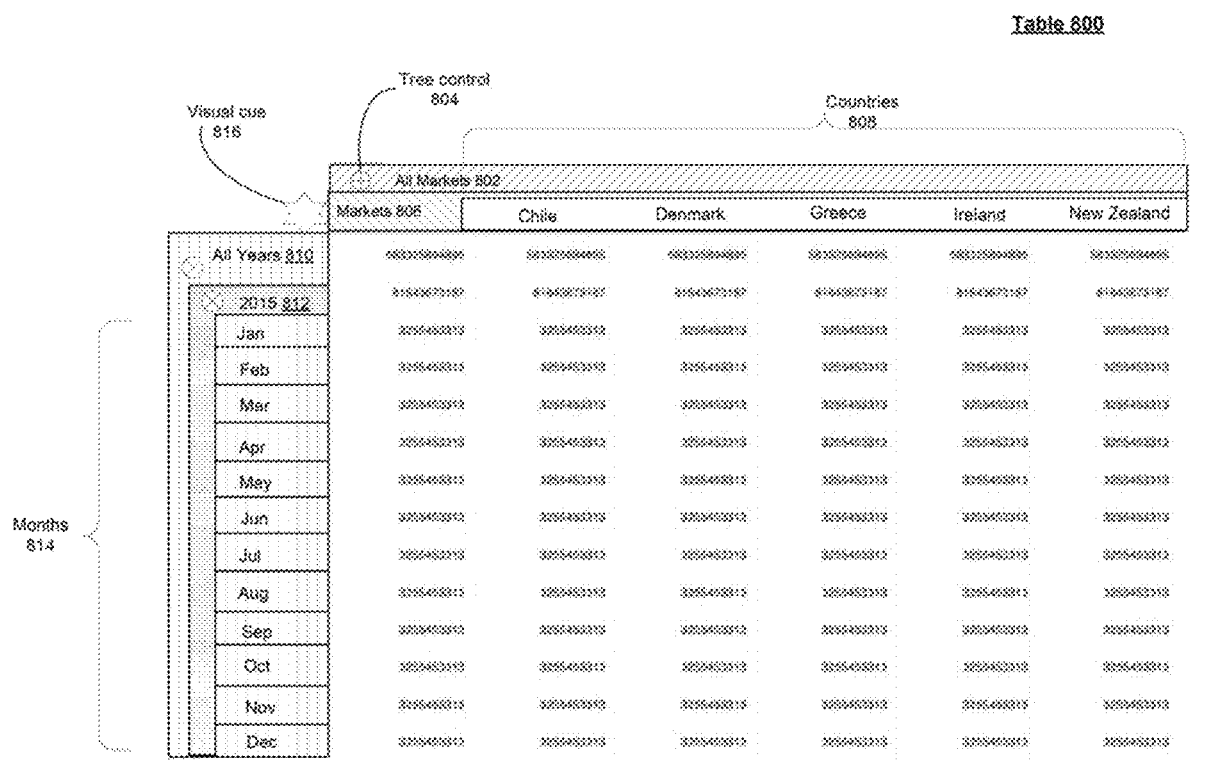

Continuing the current example, FIG. 8 depicts, using an embodiment of the disclosure, table 800. As a result of the user scrolling further to the right in the increased number of countries in Countries 808, past column Big Market 704 of FIG. 7, which is hidden from view, as is a portion of column Small Markets 806. The header of Big Market 704 of FIG. 7 does not appear in table 800 atop column Small Markets 806 nor underneath All Markets 802 because all children of Big Market 704 of FIG. 7 are collapsed in the view of table 800. Therefore, there are no columns under Big Market 704 of FIG. 7. However, because Big Market 704 of FIG. 7 is a sibling of Small Markets 806 visual cue 816 indicating existence of another member currently hidden from view is added to the left of the heading of Small Markets 806. When the user hovers over the interactive control of visual cue 816, a tooltip appears indicating which sibling is currently hidden from view. A tooltip is an example of a technique to provide contextual information for an associated element at a particular location temporarily to aid the user. In this example, when the user clicks on visual cue 816, the user navigates back to the previous position in the table where Big Market 704 of FIG. 7 was expanded. Row headings are now labeled All Years 810, 2015 812 (year 2015) and months 814 comprising abbreviated 3-letter month names Jan through Dec.

Figure 9:
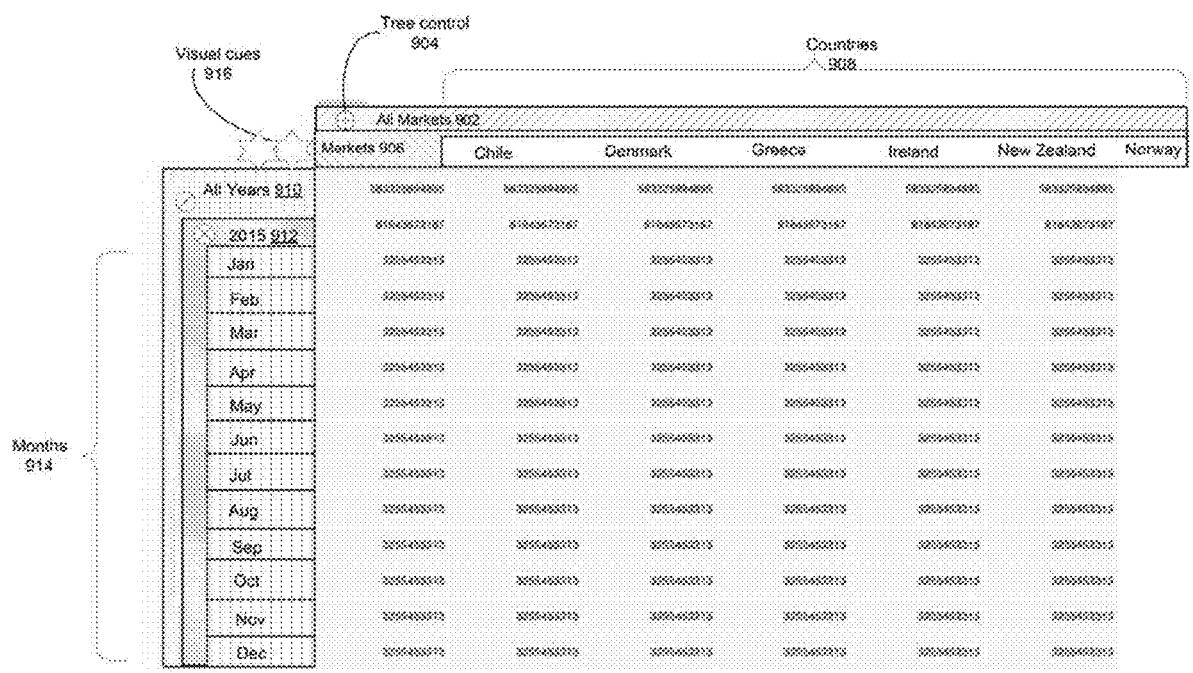
FIG. 9 is a tabular view of a visual display of hierarchical data including visual cues for more than one hidden sibling in accordance with one embodiment of the disclosure.

With reference to FIG. 9, the example of table 800 of FIG. 8 is continued to depict a case where there is more than one hidden sibling. Table 900 includes an increased number of countries in Countries 908 and an expanded version of the interactive control of visual cue 816 of FIG. 8. Visual cues 916 enables the user to navigate back to any one of the siblings of Small Markets 906 in the order the siblings appear in table 900. Furthermore, as shown with regard to table 800 of FIG. 8, when the user hovers over an entry in visual cues 916, a tooltip displays a descriptor for a respective sibling currently hidden from view. As before, the user can readily discover the names of each of the siblings hidden from view. The tooltip helps the user identify which sibling is to be a desired target of navigation for the user.

In this example two entries are shown in visual cues 916, however the visual representation is not restricted too this particular arrangement. In another example, visual cues 916 may appear as a ribbon with segments containing respective hidden node heading entries displayed as a result of a user gesture, including a mouse hover action. In yet another example, a single visual cue placed as described for visual cues 916 may display a stack of hidden entries as a result of a user gesture, including a mouse hover action, each of which is further revealed by a gesture of the user. The use of an icon merely suggest hidden information may be further revealed to aid the user in identifying hidden node heading entries and being able to selectively "jump" directly to the position within the data hierarchy to the respective node heading. Row headings are now labeled All Years 910, 2015 912 (year 2015) and months 914 comprising abbreviated 3-letter month names Jan through Dec.

Figure 10:
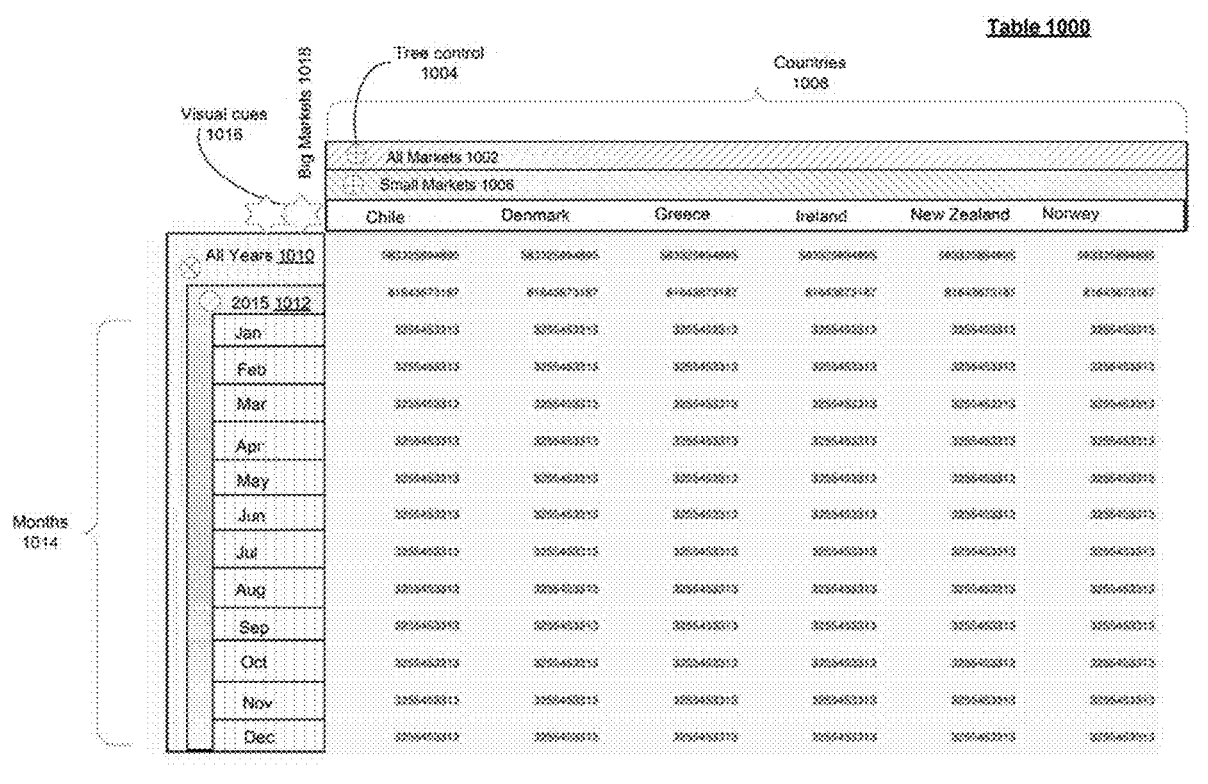

With reference to FIG. 10, the example of table 800 of FIG. 8 is continued to depict a case where there is more than one hidden sibling. Table 1000 includes the same number of entries in countries 1008 as countries 908 of FIG. 9. However, as a result of the user scrolling past Small Markets 1006, this column heading is promoted above the children and placed below All Markets 1002. As before, a tree control similar to tree control 1004 is visible next to Small Markets 1006 for use when the user wants to expand this column again. The user can scroll back to the initial point, tap on the associated tree control or the full top header.

Visual cues 1016 enables the user to navigate back to any one of the siblings in the order the siblings appeared in table 1000. Furthermore, as shown, when the user hovers over a particular entry in the interactive control of visual cues 1016, a tooltip displays a descriptor of Big Markets 1018 for the respective sibling currently hidden from view. As before, the user can readily discover the names of each of the siblings hidden from view. This tooltip verifies, to the user, the identity of the sibling as a target of navigation. Row headings are now labeled All Years 1010, 2015 1012 (year 2015) and months 1014 comprising abbreviated 3-letter month names Jan through Dec.

Figure 11:
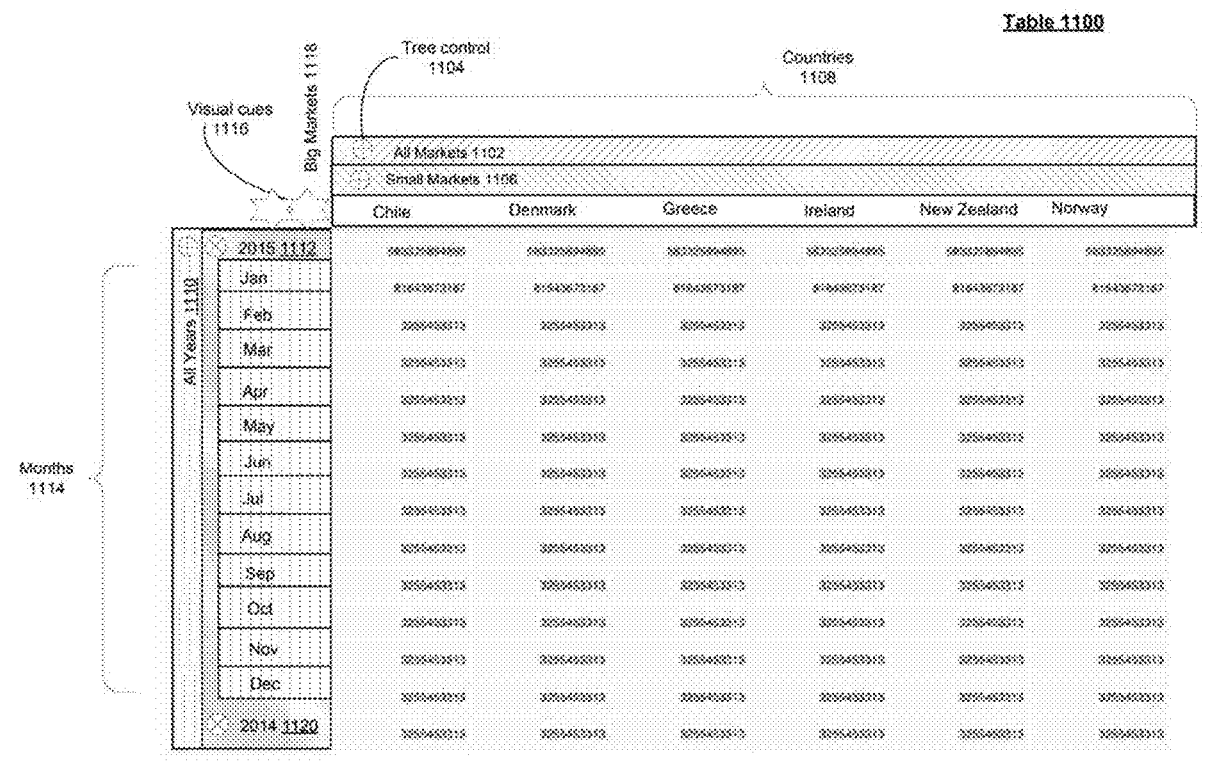

With reference to FIG. 11, the example of previous FIG. 10 is continued. However, now the discussion turns to similar actions performed using the row headings now labeled All Years 1110, 2015 1112 (year 2015) and months 1114 (associated with year 2015) as a variation of table 1000 of FIG. 10. Table 1100 includes column entries of All Markets 1102, tree control 1104, Small Markets 1106, countries 1108, visual cues 1116, and Big Markets 1118 in a variation of table 1000 of FIG. 10. Tree control 1104 associated with All Markets 1102 and similarly the tree control associated with Small Markets 1106 enables the user to expand the respective column.

However, once the user scrolls past All Years 1110, this heading is promoted left of the year row headings on the side of table 1100 and spans across all of respective child rows. As before, the tree control associated with All Years 1110 is changed to be similar to tree control 1104 next to All Markets 1102 enabling the use to expand this column. The promotion of All Years 1110 also causes the row heading of 2014 1120 (year 2014) to be visible.

Figure 12:
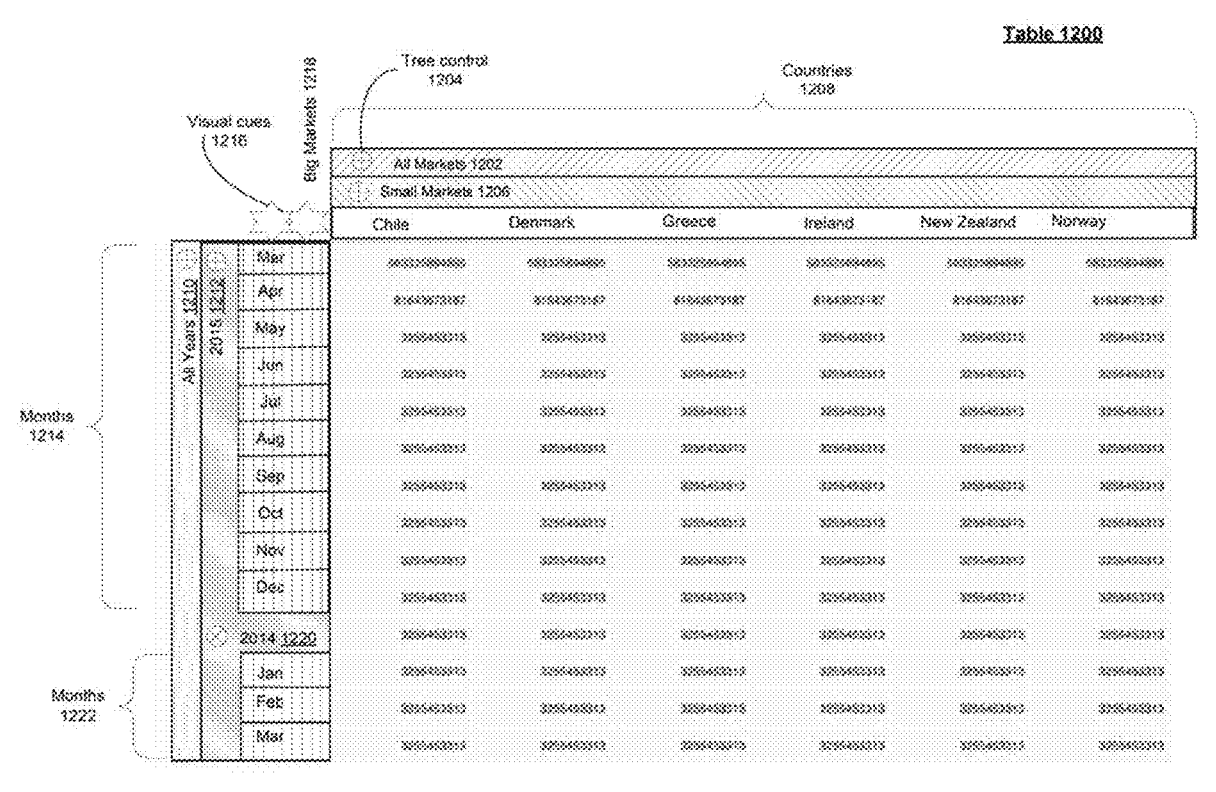

With reference to FIG. 12, the example of previous FIG. 11 is continued. However, now similar actions are performed using the row heading All Years 1210, 2015 1212 (year 2015) and months 1214 (associated with year 2015) as a variation of table 1100 of FIG. 11. Table 1200 includes column entries of All Markets 1202, tree control 1204, Small Markets 1206, countries 1208, visual cues 1216, and Big Markets 1218 in a variation of table 1100 of FIG. 11.

However, as before when the user scrolled past All Years 1210, in this scenario the user has scrolled past the year heading of 2015 1212 to reveal a subset of months 1214. Heading 2015 1212 is promoted left of the months 1214 on the side of table 1200 and spans across the subset of respective child rows. The scrolling and corresponding promotion of 2015 1212 also causes a subset of months (Jan, Feb, Mar) associated with row heading 2014 1220 (belonging to year 2014) to be visible in months 1222. However, once the user scrolls past All Years 1210, this heading 2015 1212 is promoted left of the year row headings on the side of table 1200 and spans across all of respective child rows.

As before, the tree control previously associated with year 2015 1212 is changed to be similar to tree control 1204 next to All Markets 1202 enabling the user to expand this row. The promotion of year 2015 1212 also causes the row 2014 1220 (year 2014) to be visible with an associated tree control enabling the user to collapse this row.

Figure 13:
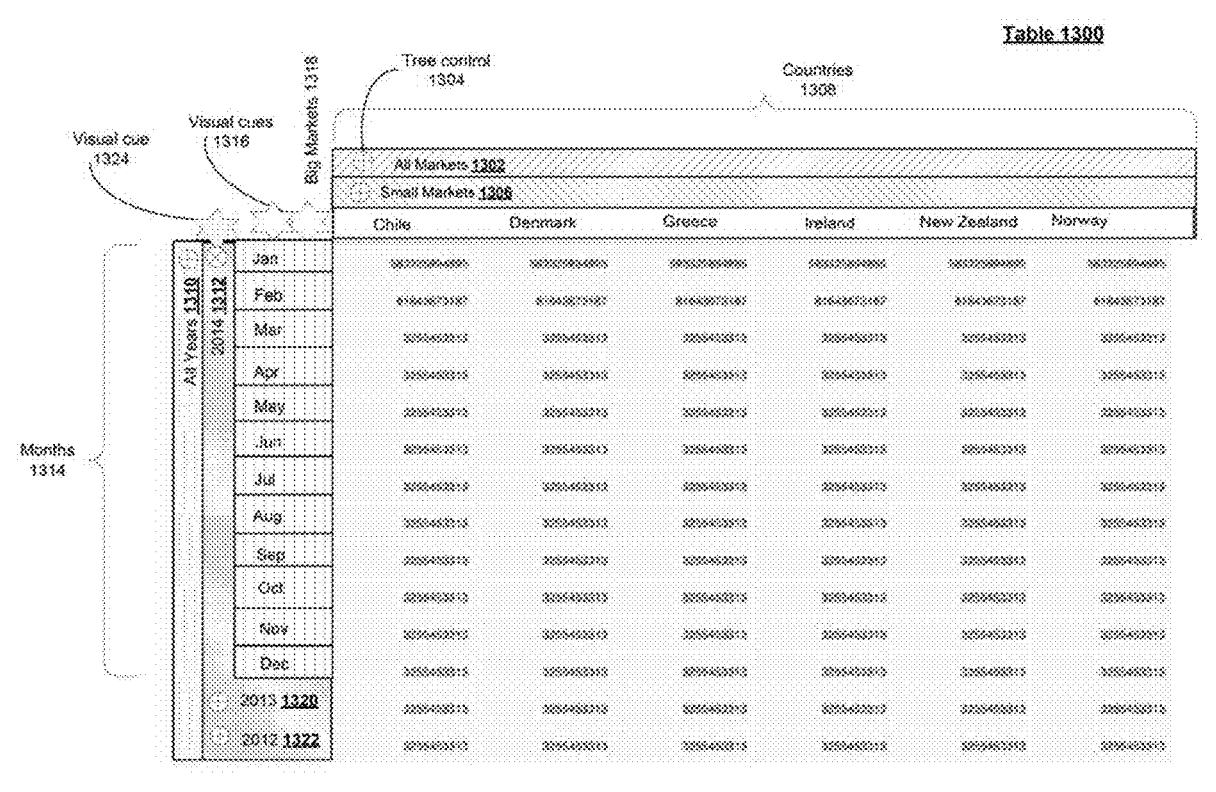

With reference to FIG. 13, the example of previous FIG. 12 is continued. However, now similar actions are performed using the row heading 2014 1312 (year 2014) as a variation of table 1200 of FIG. 12. Table 1300 includes column entries of All Markets 1302, tree control 1304, Small Markets 1306, countries 1308, visual cues 1316, and descriptor Big Markets 1318 in this variation of table 1200 of FIG. 12.

However, as before when the user scrolled past All Years 1310, in this scenario the user has scrolled past the year heading 2015 1212 of FIG. 12 to view detail of 2014 1312 in the form of months 1314. Heading 2015 1212 of FIG. 12, a sibling of 2014 1312 is now hidden from view and represented in the interactive control of visual cue 1324. Heading 2014 1312 is promoted left of the months 1314 on the side of table 1300 and spans across the subset of respective child rows. The scrolling and corresponding promotion of 2014 1312 also causes new entries for row heading 2013 1320 (belonging to year 2013) and row heading 2012 1322 (belonging to year 2012) to be visible.

The tree control previously associated with year 2014 1312 remains unchanged to enable the user to collapse this row. The tree controls associated with each of 2013 1320 and 2012 1322 respectively reflect a capability to expand the respective row.

Figure 14:
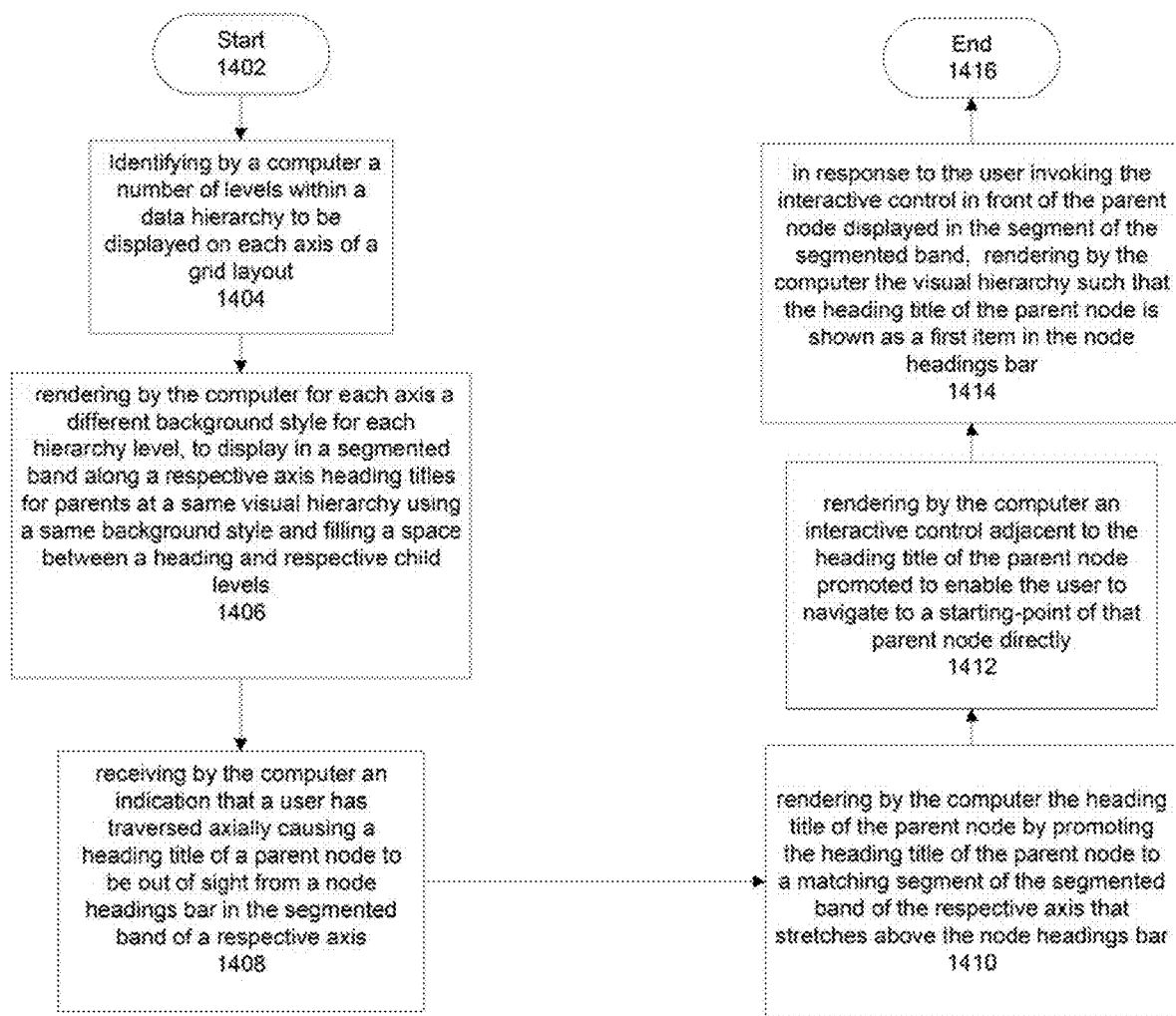
FIG. 14 a flow diagram of a process for controlling data from a data hierarchy with enhanced interactive access to ascendants while navigating in hierarchical dimensions of a tabular view in accordance with one embodiment of the disclosure.

With reference now to FIG. 14 a flow diagram of a process for controlling data from a data hierarchy with enhanced interactive access to ascendants while navigating in hierarchical dimensions of a materialized view in one embodiment of the disclosure is presented. Process 1400 is an example of a process for enhanced interactive access to ascendants while navigating in hierarchical dimensions of a materialized view using view management system 308 of FIG. 3. The terms method and process may be used interchangeably without loss of information. Process 1400 begins, step 1402 and in an embodiment of the disclosure, a data processing system, for example data processing system 300 of FIG. 3 identifies a number of levels within a data hierarchy to be displayed on along each axis of a grid layout, step 1404. In another embodiment of process 1400, another component of data processing system 300 of FIG. 3 in the form of one of applications 302 of FIG. 3 identifies the number of levels. The referenced materialized view may be representative of a crosstab/pivot table in one example of a data structure that may be materialized in a view manipulated using process 1400.

Process 1400 renders, by the computer, for each axis, a different background style for each hierarchy level, to display in a segmented band along a respective axis heading titles for parents at a same visual hierarchy using a same background style and filling a space between a heading and respective child levels, step 1406. Different background styles include different techniques to achieve visual distinction between levels in a sequence of hierarchical data. For example, styles could include techniques comprising color, highlight, shade, and pattern selections used when rendering respective levels in a hierarchy presented.

Receiving, by the computer, an indication that a user traversed axially causing a heading title of a parent node is out of sight from a node headings bar in the segmented band of a respective axis, step 1408. Traversal may be result of a user action including scrolling using an input device such as a mouse or a gesture on the graphical user interface in the form of swiping.

Process 1400 continues, rendering, by the computer, the heading title of the parent node by promoting the heading title of the parent node to a matching segment of the segmented band of the respective axis that stretches above the node headings bar, step 1410. Process 1400 continues further by rendering, by the computer, an interactive control adjacent to the heading title of the parent node promoted to enable the user to navigate to a starting-point of that parent node directly, step 1412.

In response to the user invoking the interactive control in front of the parent node displayed in the segment of the segmented band, process 1400 renders, by the computer, the visual hierarchy such that the heading title of the parent node is shown as a first item in the node headings bar, step 1414 and terminates thereafter step 1416.

Figure 15:
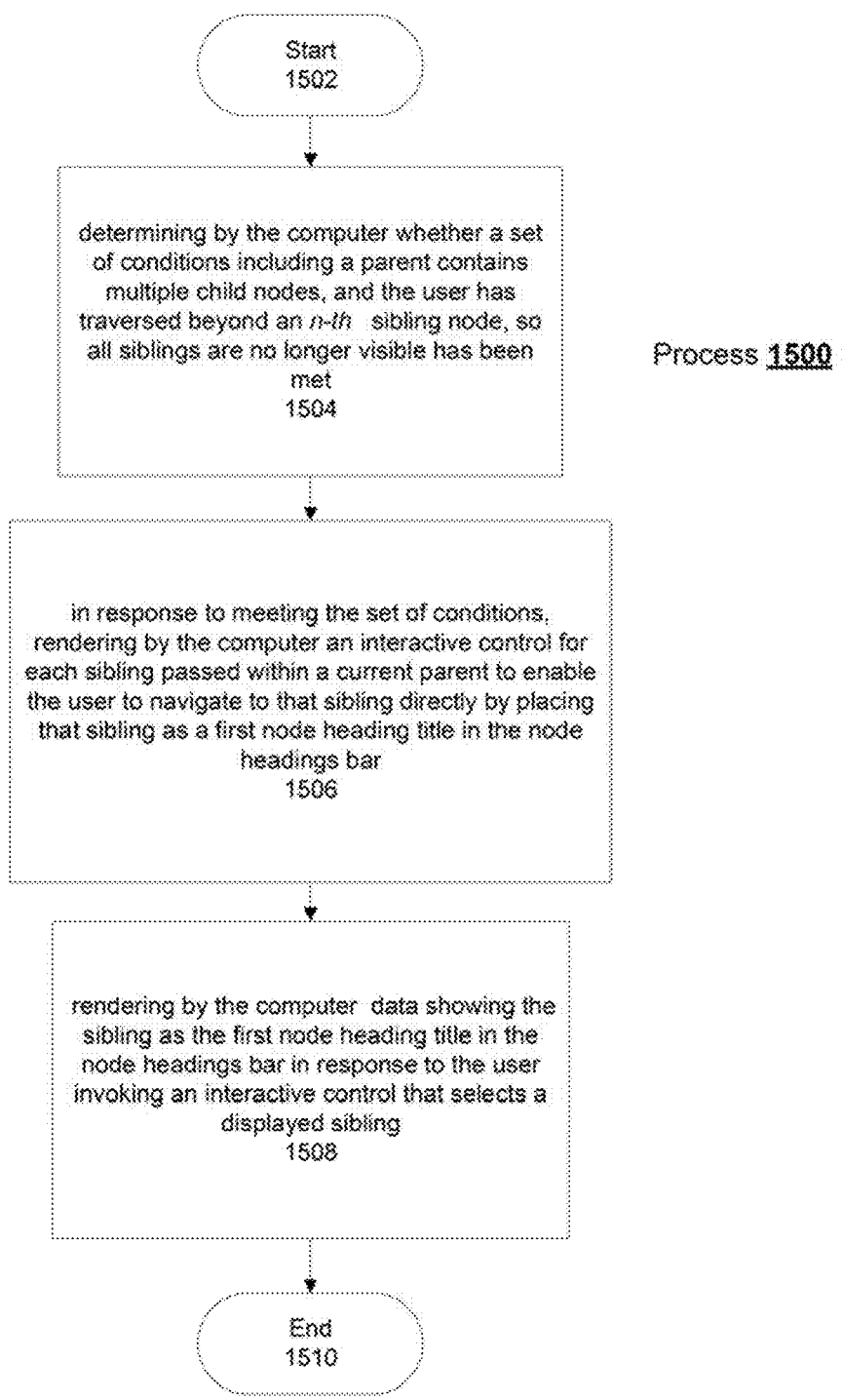
FIG. 15 a flow diagram of a sub-process for controlling data from a data hierarchy with enhanced interactive access to ascendants while navigating in hierarchical dimensions of a tabular view in one embodiment of the disclosure.

With reference now to FIG. 15 a flow diagram of a sub-process for controlling data from a data hierarchy with enhanced interactive access to ascendants while navigating in hierarchical dimensions of a materialized view in one embodiment of the disclosure is presented. Process 1500 is an example of a sub-process of process 1400 of FIG. 14 for enhanced interactive access to ascendants while navigating in hierarchical dimensions of the materialized view using view management system 308 of FIG. 3. Process 1500 begins, step 1502 by determining, by the computer, whether a set of conditions including a parent contains multiple child nodes, and the user has traversed beyond an $n^{th}$ sibling node, so that all siblings are no longer visible, step 1504.

In response to meeting the conditions, process 1500 renders, by the computer, an interactive control for each sibling passed within the current parent to enable the user to navigate to that sibling directly by placing that sibling as a first item in the node headings bar, step 1506.

Process 1500 continues, rendering, by the computer, data showing the sibling as a first node heading title in the node headings bar in response to the user invoking an interactive control that selects a displayed sibling, step 1508 and terminates thereafter step 1510.

Figure 16:
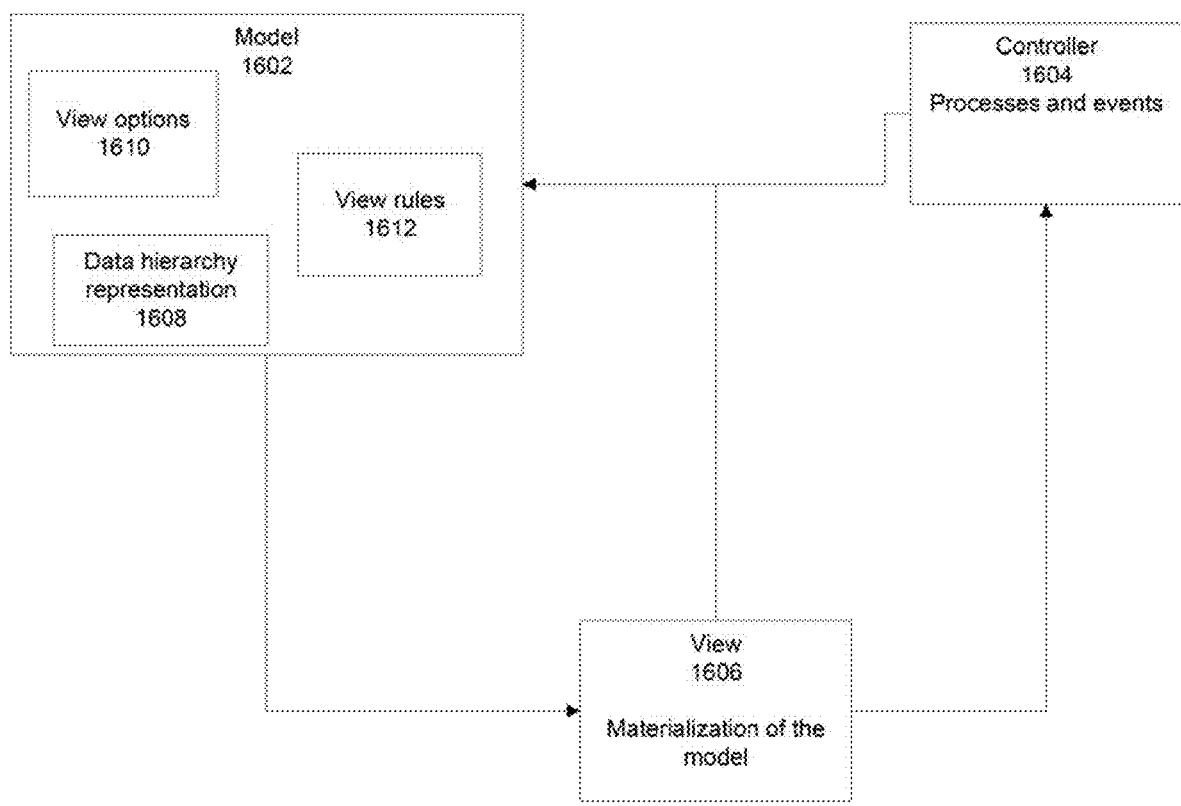
FIG. 16 is a flow diagram of a control and data flow among components of a viewing system used when navigating in hierarchical dimensions of a tabular view in one embodiment of the disclosure.

With reference now to FIG. 16 a control and data flow among several components of viewing system 1600 in an embodiment of the disclosure are presented. Viewing system 1600 represents an embodiment of a visual management element of visual management system 308 of FIG. 3 as used with an embodiment of process 1400 of FIG. 14. The components include a set of elements comprising a model 1602, a controller 1604, and a view 1606. Constructing and refreshing of a graphical user interface is performed using these components of the visual management system 308. Model 1602 is an object within data processing system representing data, for example, data hierarchy representation 1608 comprising a structure of the data hierarchy, data contained within objects comprising the data hierarchy and a current condition of expansion or contraction (collapse) of each node defined within. View options 1610 including visibility and highlighting for use with the data. A set of view rules 1612 defining conditional logic used when materializing the data of data hierarchy representation 1608 is also part of model 1602. Any updates made to the content of model 1602 will be reflected in a subsequent rendering of view 1606. Rules 1612 provides definitions describing conditional processing of respective nodes in an operation typically as a result of user actions. For example, when a node is completely hidden, but one or more siblings remain, a visual cue denoting the existence of the hidden node should be placed in the view. In another example, node comprising one or more children is collapsed, but one or more siblings remain, the node is promoted in a visual order in a respective updated materialized view. Further explanation of rule processing is provided in a flow diagram of a high-level view of a process in an embodiment of the disclosure.

View 1606 represents a visualization of a particular instance of the data hierarchy in a corresponding condition of model 1602. In the examples shown, an embodiment of view 1606 renders the data hierarchy in the form of a tree structure comprising nodes including a root node and one or more levels including siblings, which may further include sub-levels also including siblings. The controller 1604 provides a set of functions capable of changing the condition of model 1602 through iterations of user interaction. User events, including gestures comprising mouse clicks received by view 1606 are sent as events to controller 1604, causing appropriate changes to model 1602 as well as updates to view 1606.

For example, when the user clicks on tree control associated with a node in view 1606 processing of a sequence of actions is triggered. View 1606 notifies controller 1604 that a particular tree control has been selected. Controller 1604 processes this event and changes model 1602 to one of an expanded or a collapsed condition, as appropriate for the action of the instant tree control. Controller 1604 notifies view 1606 that a change in model 1602 has just occurred. As a result, view 1606 updates the previous rendering to visualize the particular change that occurred.

In another example, when a user scrolling activity traverses a boundary in the data hierarchy, visibility of some associated nodes changes. As a result, one or more nodes need to be updated in view 1606. In this example, controller 1604 is directly notified of this scrolling activity and informs view 1606 a refresh of the previous visual representation is required and also informs model 1610 of a change in visibility of the one or more nodes.

Figure 17:
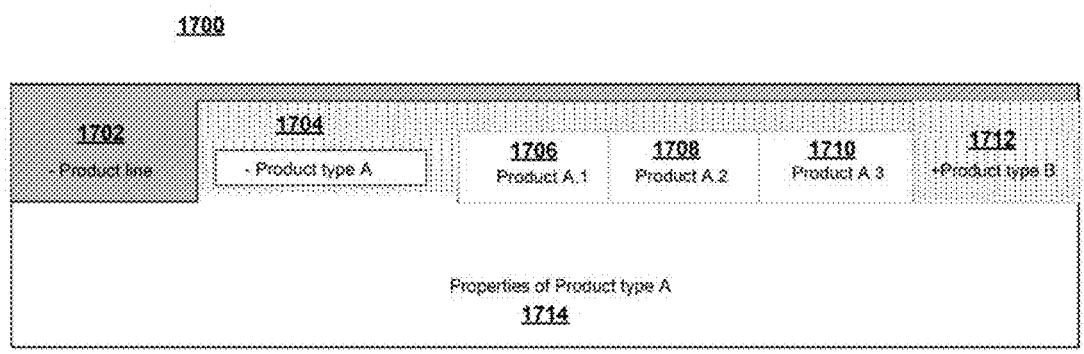
FIG. 17 is a view of a visual display of hierarchical data for a property of a child element of a data hierarchy in accordance with one embodiment of the disclosure.

With reference now to FIG. 17 a partial view of a graphical user interface for display of hierarchical data for a property of a child element of a data hierarchy in an embodiment of the disclosure is presented. View 1700 shows a hierarchy of entries in a set of segmented bands, enabling users to select a single node within the hierarchy to display contents/properties associated with the respective selection as a container.

View 1700 displays a set of segmented bands comprising column headings of parents Product line 1702, Product type A 1704, and Product type B 1712. Parent heading Product type A 1704 further includes children comprising Product A.1 1706, Product A.2 1708 and Product A.3 1710. In this example, Product type A 1704 is an element of interest and has been selected to display associated contents/properties as Properties of Product type A 1714. In this example, Product type A 1704 is "highlighted" by a rectangular box surrounding the heading, including the interactive control, as an aid to the user indicating which particular element is in focus for display of associated contents/properties.

Parent headings Product line 1702 and Product type A 1704 have associated interactive controls displayed in the form of a – sign indicating each of these parent headings has already been expanded. As a result, these parent headings can now only be collapsed. In contrast parent heading Product type B 1712 has an associated interactive control displayed in the form of a + sign indicating this parent heading can be expanded.

In the current example, column headings displayed horizontally form a set of segmented bands. The visual style of each visible parent Product line 1702 and Product type A 1704 stretches above their respective children to remain visible above the respective children. For example, the column heading Product line 1702 stretches above the children comprising Product type A 1704 (including comprising Product A.1 1706, Product A.2 1708 and Product A.3 1710) and Product type B 1712. The visible parent of Product type B 1712 has no visible children and therefore does not have an associated band stretching over any children. However, visible parent of Product type B 1712 does have the same background as the sibling Product type A 1704 because these elements are at the same level in the visual hierarchy.

Figure 18:
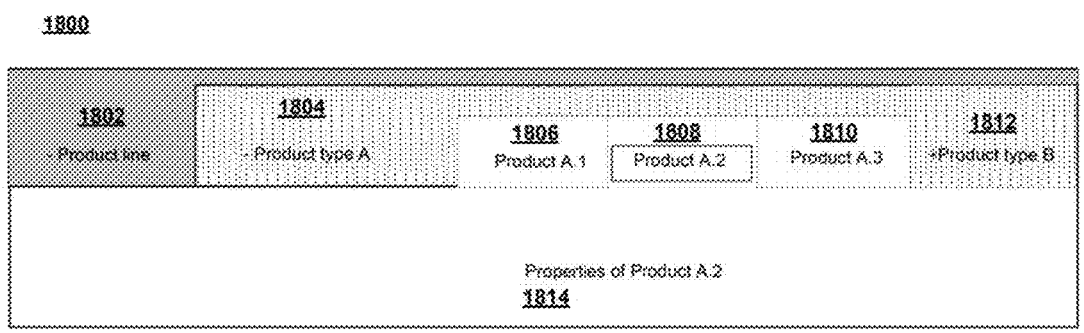
FIG. 18 is a view of a visual display of hierarchical data for a property of a sub-element of an element in FIG. 17 in accordance with one embodiment of the disclosure.

With reference now to FIG. 18 a partial view of a graphical user interface for display of hierarchical data for a property of a child element of an element of FIG. 17 in an embodiment of the disclosure is presented. View 1800 is a variation of view 1700 of FIG. 17 that displays a set of segmented bands comprising column headings of parents Product line 1802, Product type A 1804, and Product type B 1812. Parent heading Product type A 1804 further includes children comprising Product A.1 1806, Product A.2 1808 and Product A.3 1810. In this example, Product A.2 1808 is an element of interest and has been selected to display associated contents/properties as Properties of Product A.2 1814. Furthermore, Product A.2 1808 is "highlighted" by a rectangular box surrounding the heading as an aid to the user indicating which particular element is in focus for display of associated contents/properties.

As before in the similar display of FIG. 17, parent headings Product line 1802 and Product type A 1804 have associated interactive controls displayed in the form of a – sign indicating each of these parent headings has already been expanded. As a result, these parent headings can now only be collapsed. In contrast parent heading Product type B 1812 has an associated interactive control displayed in the form of a + sign indicating this parent heading can be expanded.

With reference now to FIG. 19 a view of a graphical user interface of a mobile device for displaying hierarchical data in an embodiment of the disclosure is presented. View 1900 shows a hierarchy of location information described as a set of continents, subset by countries within a respective continent and further subset by territories within a respective country all forming a set of interrelated parent and child relationships.

Referring to view 1900, heading 1902 indicates a user is to select a location from the visible elements provided. Heading 1904 represents a parent heading belonging to the category of continents and has an associated interactive control displayed in the form of a – sign indicating this parent heading has already been expanded. As a result, this parent heading can only be collapsed. In contrast parent heading 1914, associated with Europe, has an associated interactive control displayed in the form of a + sign indicating this parent heading can be expanded to display respective children.

In the current example, the row headings are displayed vertically to form a set of segmented bands. The visual style of each visible parent heading 1904 and heading 1906 stretches above their respective children to remain visible above the respective children. For example, heading 1904 stretches above children comprising heading 1906 (including a group of children of heading 1908), heading 1910 and heading 1912. The visible parent of heading 1914 has no visible children and therefore does not have an associated band stretching over any children. However, visible parent of heading 1914 does have the same background as the sibling heading 1904 because these elements are at the same level in the visual hierarchy. In a similar manner, the siblings represented as headings 1906, 1910 and 1912 have the same background, but differ from that of parent heading 1904.

The set of segmented bands shown associated with headings 1904 and 1906 form an easy to use navigator of children, enabling the user to selectively choose a child.

With reference now to FIG. 20 a view of a graphical user interface of the mobile device of FIG. 19 as a result of a scrolling action in an embodiment of the disclosure is presented. View 2000 shows a variation of view 1900 of FIG. 19 in which the user has scrolled to reveal additional continents not previously visible in view 1900 of FIG. 19. View 2000 is updated to include headings of 2016 (Africa) and 2017 (Asia).

As a result of scrolling through entries, heading 2004 has been promoted to a band positioned left of sibling entries including headings 2006, 2008, 2010 and 2012. Visible parent of heading 2004 now stretches over respective children defined as headings 2006 (including a group of children of heading 2008), 2010 and 2012.

With reference now to FIG. 21 a flow diagram of a process for controlling data from a data hierarchy with enhanced interactive access to ascendants while navigating in hierarchical dimensions of a tabular view in one embodiment of the disclosure is presented. Process 2100 is an example of a process for enhanced interactive access to ascendants while navigating in hierarchical dimensions in a materialized view using view management system 308 of FIG. 3. Process 2100 begins, step 2102 and in this embodiment of the disclosure a computer is a variant of data processing system 300 of FIG. 3.

Process 2100 continues by determining, by the computer, a number of levels used in a hierarchy of relations, step 2104. The process contuses further by rendering, by the computer, header rows and header columns having multiple levels using multiple different visual bands matching a number of levels opened in a respective row and a respective column section in the materialized view, step 2106.

Process 2100 continues further presenting, by the computer in the materialized view, a tree control adjacent to at least one node in the header rows and header columns of displayed information, step 2108 and in response to a user scrolling a predetermined distance in a first direction, maintaining by the computer, a parent name in view, step 2110.

In response to the user scrolling past the predetermined distance in the first direction, process 2100 continues by promoting by the computer, the parent name to a position above a first visible child name, step 2112. Further in response to the user scrolling so that none of the parent names are in view, process 2100 for a first leaf continues with the computer displaying all parent names above the first leaf member, matching parent bands and tracking the parent name, step 2114. In response to receiving a selection by the user to close a particular parent node above a leaf node location, process 2100 causes automatically closing, by the computer, the particular parent node to occur, step 2116.

Process 2100 further continues adding, by the computer, sibling indicators to a level of the leaf node location by the computer, step 2118. In response to the user selecting one of the sibling indicators, process 2100 continues navigating, by the computer, directly to that location in the hierarchy of relations, step 2120 and terminates thereafter, step 2122.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for controlling data from a data hierarchy with enhanced interactive access to ascendants while navigating in hierarchical dimensions of a materialized view, the computer-implemented method comprising:
    identifying, by a computer, a number of levels within the data hierarchy to be displayed on a node headings bar along each axis of a grid layout;
    receiving, by the computer, an indication that a user is scrolling along a respective axis of the grid layout, and as scrolling is performed on the respective axis,
        incrementally reducing the visibility of a parent node and a heading title associated with the parent node while incrementally increasing the visibility of one or more child nodes, wherein incrementally reducing the visibility of the parent node further comprises causing the parent node and the heading title of the parent node to be incrementally promoted above the one or more child nodes; and
    in response to the user scrolling pass a predetermined distance, promoting the parent node above the one or more child nodes on the node headings bar such that the parent node stretches across a segmented band that includes the one or more child nodes.

2. The computer-implemented method of claim 1 further comprising:
    determining, by the computer, whether a set of conditions that includes determining that a respective parent node contains multiple child nodes, and that the user has traversed beyond an nth sibling node so that all sibling nodes are no longer visible, is met;
    in response to meeting the set of conditions, rendering, by the computer, an interactive control for each sibling node passed within a current parent node to enable the user to navigate to that sibling node directly by placing that sibling node as a first node heading title in the node headings bar; and
    rendering, by the computer, data showing the sibling node as the first node heading title in the node headings bar in response to the user invoking an interactive control that selects a displayed sibling.

3. The computer-implemented method of claim 2 wherein determining, by the computer, whether a set of conditions that includes the parent node containing multiple child nodes, and the user traversing beyond an nth sibling node so that all siblings are no longer visible, is met, further comprises:

receiving a notification by a controller of a result of scrolling activity that traverses a boundary in the data hierarchy;

informing, by the controller, a view that a refresh of a previous visual representation is required; and informing, by the controller, a model of a change in visibility of one or more nodes.

4. The computer-implemented method of claim 1, further comprising:

rendering for each axis, by the computer, a different background style for each hierarchy level, to display in a segmented band along respective axis heading titles for parent levels at a same visual hierarchy using a same background style and filling a space between a heading and respective child levels; and using a different background style for each level with an associated band in the segmented band that stretches above respective children levels so that a background style of a parent level is different from the background style of a respective child level, and each level within the data hierarchy has a respective own background style.

5. The computer-implemented method of claim 1, further comprising:

rendering, by the computer, an interactive control adjacent to the heading title of the parent node promoted to enable the user to navigate to a starting-point of that parent node directly; and in response to the user invoking the interactive control in front of the parent node displayed in the segment of the segmented band, rendering, by the computer, the visual hierarchy such that the heading title of the parent node is shown as a first item in the node headings bar.

6. The computer-implemented method of claim 5 wherein the interactive control is applied to at least one of a horizontal axis and a vertical axis and wherein the materialized view is one of a tree view and a tabular view.

7. The computer-implemented method of claim 1 wherein the data hierarchy is in a form of a tree structure comprising nodes including a root node and one or more levels including siblings, and wherein at least one of the one or more levels including siblings further including sub-levels also including siblings.

8. The computer-implemented method of claim 1 further comprising:

in response to receiving an indication of a user input device hovering above a visual cue adjacent the segmented band and associated with a hidden parent node, rendering a descriptor representative of a respective node heading title associated with hidden parent node; and in response to receiving a user selection of a particular visual cue traversing directly to a position in the data hierarchy of the hidden parent node indicated by the descriptor to make the hidden parent node visible.

9. The computer-implemented method of claim 1 further comprising:

in response to receiving a selection from the user to display property information associated with the parent node, highlighting the parent node selected and displaying the property information associated with the parent node selected.

10. The computer-implemented method of claim 1 further comprising:

in response to receiving a selection from the user to display property information associated with a child node, highlighting the child node selected and displaying the property information associated with the child node selected.

11. The computer-implemented method of claim 1 wherein the computer is a mobile device and wherein the segmented band is displayed along a vertical axis for heading titles for parents at a same visual hierarchy using a same background style and filling a space between heading titles for parent levels and respective child levels and wherein a different background style is used for each level with an associated band in the segmented band that stretches above respective children levels so that a background style of a parent level is different from the background style of a respective child level, and each level within the data hierarchy has a respective own background style and wherein each parent node has an associated interactive control.

12. A system for controlling data from a data hierarchy with enhanced interactive access to ascendants while navigating in hierarchical dimensions of a materialized view, the system comprising:

a bus;

a memory connected to the bus, having computer executable instructions stored thereon; and one or more processors connected to the bus, wherein at least one of the one or more processors executes the computer executable instructions of a method comprising:

identify a number of levels within the data hierarchy to be displayed on a node headings bar along each axis of a grid layout;

receive an indication that a user is scrolling along a respective axis of the grid layout, and as scrolling is performed on the respective axis, incrementally reduce the visibility of a parent node and a heading title associated with the parent node while incrementally increasing the visibility of one or more child nodes, wherein incrementally reducing the visibility of the parent node further comprises causing the parent node and the heading title of the parent node to be incrementally promoted above the one or more child nodes; and in response to the user scrolling pass a predetermined distance, promote the parent node above the one or more child nodes on the node headings bar such that the parent node stretches across a segmented band that includes the one or more child nodes.

13. The system of claim 12 wherein the at least one of the one or more processors further executes the computer executable instructions to:

determine whether a set of conditions that includes determining that a respective parent contains multiple child nodes, and that the user has traversed beyond an nth sibling node so that all siblings are no longer visible, is met;

in response to meeting the set of conditions, render an interactive control for each sibling passed within a current parent node to enable the user to navigate to that sibling node directly by placing that sibling node as a first node heading title in the node headings bar; and render data showing the sibling node as the first node heading title in the node headings bar in response to the user invoking an interactive control that selects a displayed sibling node.

14. The system of claim 13 wherein the at least one of the one or more processors executes the computer executable instructions to determine whether the set of conditions including determining that a respective parent node contains multiple child nodes, and that the user has traversed beyond an nth sibling node so that all siblings are no longer visible, is met, further executes the computer executable instructions to:
   receive a notification by a controller of a result of scrolling activity that traverses a boundary in the data hierarchy;
   inform, by the controller, a view that a refresh of a previous visual representation is required; and
   inform, by the controller, a model of a change in visibility of one or more nodes.

15. The system of claim 12 wherein the at least one of the one or more processors executes computer executable instructions to render for each axis, a different background style for each hierarchy level, to display in a segmented band along respective axis heading titles for parent levels at a same visual hierarchy using a same background style and filling a space between a heading and respective child levels further executes the computer executable instructions to;
   use a different background style for each level with an associated band in the segmented band that stretches above respective children levels so that a background style of a parent level is different from the background style of a respective child level, and each level within the data hierarchy has a respective own background style.

16. The system of claim 12, further comprising:
   rendering, by the computer, an interactive control adjacent to the heading title of the parent node promoted to enable the user to navigate to a starting-point of that parent node directly; and
   in response to the user invoking the interactive control in front of the parent node displayed in the segment of the segmented band, rendering, by the computer, the visual hierarchy such that the heading title of the parent node is shown as a first item in the node headings bar.

17. A computer program product comprising a computer readable storage medium having computer readable program instructions for controlling data from a data hierarchy with enhanced interactive access to ascendants while navigating in hierarchical dimensions of a materialized view thereof for causing a processor to perform a method comprising;
   identify, by a computer, a number of levels within the data hierarchy to be displayed on a node headings bar along each axis of a grid layout;
   receive, by the computer, an indication that a user is scrolling along a respective axis of the grid layout, and as scrolling is performed on the respective axis,
      incrementally reducing the visibility of a parent node and a heading title associated with the parent node while incrementally increasing the visibility of one or more child nodes, wherein incrementally reducing the visibility of the parent node further comprises causing the parent node and the heading title of the parent node to be incrementally promoted above the one or more child nodes; and
      in response to the user scrolling pass a predetermined distance, promoting the parent node above the one or more child nodes on the node headings bar such that the parent node stretches across a segmented band that includes the one or more child nodes.

18. The computer program product of claim 17 wherein the computer executable instructions further comprise computer readable program instructions to:
   determine whether a set of conditions that includes determining that a respective parent node contains multiple child nodes, and that the user has traversed beyond an nth sibling node, so that all siblings are no longer visible, is met;
   in response to meeting the set of conditions, render an interactive control for each sibling passed within a current parent node to enable the user to navigate to that sibling node directly by placing that sibling node as a first node heading title in the node headings bar; and
   render data showing the sibling as the first node heading title in the node headings bar in response to the user invoking an interactive control that selects a displayed sibling.

19. The computer program product of claim 17, further comprising:
   rendering, by the computer, an interactive control adjacent to the heading title of the parent node promoted to enable the user to navigate to a starting-point of that parent node directly; and
   in response to the user invoking the interactive control in front of the parent node displayed in the segment of the segmented band, rendering, by the computer, the visual hierarchy such that the heading title of the parent node is shown as a first item in the node headings bar.

* * * * *